United States Patent
Kimura et al.

(10) Patent No.: US 10,706,707 B2
(45) Date of Patent: Jul. 7, 2020

(54) SECURITY MANAGEMENT SYSTEM, SECURITY MANAGEMENT METHOD AND RECORDING MEDIUM

(71) Applicant: KIMURA CORPORATION, Tokyo (JP)

(72) Inventors: Tomoei Kimura, Tokyo (JP); Chisato Kanamori, Tokyo (JP)

(73) Assignee: KIMURA CORPORATION, Tokyo (JP)

( * ) Notice: Subject to any disclaimer, the term of this patent is extended or adjusted under 35 U.S.C. 154(b) by 0 days.

(21) Appl. No.: 16/325,624

(22) PCT Filed: Jul. 24, 2017

(86) PCT No.: PCT/JP2017/026702
§ 371 (c)(1),
(2) Date: Feb. 14, 2019

(87) PCT Pub. No.: WO2018/034107
PCT Pub. Date: Feb. 22, 2018

(65) Prior Publication Data
US 2019/0221098 A1    Jul. 18, 2019

(30) Foreign Application Priority Data
Aug. 15, 2016    (JP) .................................. 2016-159391

(51) Int. Cl.
*G08B 21/04*    (2006.01)
*G06K 9/00*    (2006.01)
(Continued)

(52) U.S. Cl.
CPC ........ *G08B 21/043* (2013.01); *G06K 9/00711* (2013.01); *G06T 5/002* (2013.01);
(Continued)

(58) Field of Classification Search
CPC .............. G08B 21/043; G08B 21/0476; G06K 9/00711; G06K 2009/00738; G06T 5/002
(Continued)

(56) References Cited

U.S. PATENT DOCUMENTS 6,331,818 B1    12/2001 Hiraga
2002/0044682 A1    4/2002 Weil et al.
(Continued)

FOREIGN PATENT DOCUMENTS

EP    2 161 695 A1    3/2010
GB    2444107    5/2008
(Continued)

OTHER PUBLICATIONS

International Preliminary Report on Patentability for PCT/JP2017/026702 dated Feb. 28, 2019 in 11 pages.
(Continued)

*Primary Examiner* — John A Tweel, Jr.
(74) *Attorney, Agent, or Firm* — Knobbe, Martens, Olson & Bear LLP

(57) ABSTRACT

The present invention provides a feature that manages security while maintaining the privacy of a user. The present invention is provided with an object detection unit for detecting the state of an object in a target booth, an abnormality determination unit for comparing the detection result of the object with a prescribed state and determining abnormality on the basis of the comparison result, a photograph unit for photographing the inside of the target booth, and a video control unit for setting the resolution of a video signal outputted from the photograph unit on the basis of the result of the abnormality determination.

8 Claims, 21 Drawing Sheets

(51) Int. Cl.
  *H04N 7/18* (2006.01)
  *G08B 25/00* (2006.01)
  *G08B 25/04* (2006.01)
  *G08B 21/00* (2006.01)
  *G06T 5/00* (2006.01)

(52) U.S. Cl.
  CPC ......... *G08B 21/00* (2013.01); *G08B 21/0476* (2013.01); *G08B 25/00* (2013.01); *G08B 25/04* (2013.01); *H04N 7/18* (2013.01); *G06K 2009/00738* (2013.01)

(58) Field of Classification Search
  USPC ...................................................... 340/573.1
  See application file for complete search history.

(56) References Cited

U.S. PATENT DOCUMENTS

| | | | |
|---|---|---|---|
| 2004/0160581 | A1 | 8/2004 | Parker et al. |
| 2005/0062849 | A1* | 3/2005 | Foth ................... G06Q 10/08 348/159 |
| 2006/0001545 | A1* | 1/2006 | Wolf ................... A47K 3/001 340/573.1 |

FOREIGN PATENT DOCUMENTS

| | | |
|---|---|---|
| JP | H08-050693 A | 2/1996 |
| JP | H08-150125 | 6/1996 |
| JP | H09-050529 | 2/1997 |
| JP | H11-101502 A | 4/1999 |
| JP | H11-339169 A | 12/1999 |
| JP | 2000-099863 A | 4/2000 |
| JP | 2001-351097 A | 12/2001 |
| JP | 2002-042267 A | 2/2002 |
| JP | 2004-056318 A | 2/2004 |
| JP | 2006-514330 A | 4/2006 |
| JP | 2007-241446 A | 9/2007 |
| JP | 2011-049646 | 3/2011 |
| JP | 4859879 B2 | 1/2012 |
| JP | 2015-087882 | 5/2015 |
| JP | 2017-163289 | 9/2017 |

OTHER PUBLICATIONS

International Search Report for PCT/JP2017/026702 dated Oct. 4, 2017 in 2 pages.
Extended European Search Report dated Jan. 21, 2020 in European Application No. EP17841335.7.

* cited by examiner

- NOTIFICATION UNIT 213
- ALARM INSTRUCTION UNIT 214
- IMAGE EXTRACTION UNIT 215

| TOILET FACILITY ID | TOILET BOOTH ID | LOCATION INFORMATION |
|---|---|---|
| 001 | 10101 | FIRST BOOTH FROM THE BACK LEFT |
| 001 | 10102 | SECOND BOOTH FROM THE BACK LEFT |
| 001 | 10103 | SECOND BOOTH FROM THE FRONT LEFT |
| : | : | : |
| 002 | 20101 | |
| 002 | 20102 | |
| 002 | 20103 | |
| : | : | |
| | | |

| No | DETERMINATION CONDITION | ABNORMALITY TYPE |
|---|---|---|
| CONDITION 1 | LOCKED STATE (OPENING/CLOSING SENSOR = ON) OBJECT DETECTION UNIT 46: USER HEIGHT IS NOT HIGHER THAN H1, USER MAKES NO ACTION FOR T1 OR LONGER | USER FALLS *URGENT |
| CONDITION 2 | LOCKED STATE (OPENING/CLOSING SENSOR = ON) OBJECT DETECTION UNIT 46: USER LOCATION COINCIDES WITH TOILET BOWL LOCATION, FOOT HEIGHT IS NOT LOWER THAN H2 | USER GETS ON TOILET BOWL OR THE LIKE |
| CONDITION 3 | SITTING SENSOR = ON LASTS FOR PREDETERMINED TIME PERIOD (FOR EXAMPLE, 10 MINUTES) OR LONGER OBJECT DETECTION UNIT 46: USER HAND OR HEAD MAKES NO ACTION | USER IS UNABLE TO MOVE |
| CONDITION 4 | SITTING SENSOR = OFF LOCKED STATE LASTS FOR PREDETERMINED TIME PERIOD (FOR EXAMPLE, 15 MINUTES) OR LONGER | LONG STAY FOR OTHER THAN EVACUATION |
| CONDITION 5 | OBJECT DETECTION UNIT 46: USER MAKES NO ACTION OF REMOVING CLOTHES TOUCHES WASTE BIN WITH BOTH HANDS FOR T4 OR LONGER, OR PUT HAND IN TOILET BOWL FOR T5 OR LONGER | SETTING OF SPY CAMERA |
| CONDITION 6 | OBJECT DETECTION UNIT 46: USER PUTS SYRINGE ON BELLY, THIGH, OR ARM REACH HAND TO SHELF OR WASTE BIN | LEAVING OF INJECTION NEEDLE |
| CONDITION 7 | FIRE ALARM = ON | FIRE |
| CONDITION 8 | OBJECT THAT HAS NOT EXISTED BEFORE ENTERING OF USER EXISTS AFTER EXITING OF USER | LEAVING OF SUSPICIOUS OBJECT |
| CONDITION 9 | OBJECT THAT HAS EXISTED BEFORE ENTERING OF USER DOES NOT EXIST AFTER EXITING OF USER | REMOVING OF AMENITY |
| CONDITION 10 | OBJECT THAT HAS EXISTED BEFORE ENTERING OF USER DOES NOT EXIST IN PART OR IS DEFORMED AFTER EXITING OF USER | DAMAGING OF AMENITY |
| ⋮ | ⋮ | ⋮ |

FIG. 18
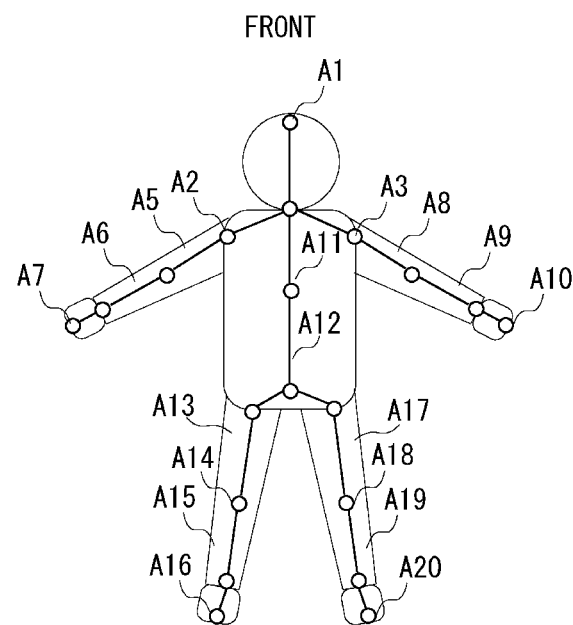
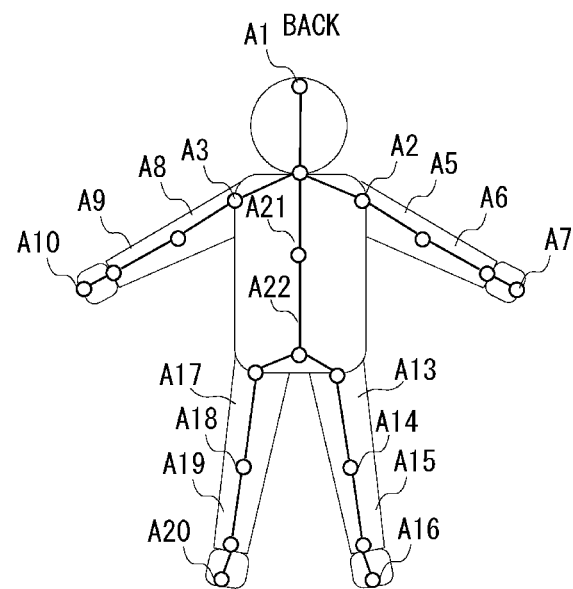

SECURITY MANAGEMENT SYSTEM, SECURITY MANAGEMENT METHOD AND RECORDING MEDIUM

CROSS-REFERENCE TO RELATED APPLICATION

This application is a US national phase of International Patent Application No. PCT/JP2017/026702 filed on Jul. 24, 2017, which claims the benefit of Japanese Patent Application No. 2016-159391 filed on Aug. 15, 2016, the entire contents of each of which are incorporated herein by reference.

FIELD

The present invention relates to a security management system.

BACKGROUND

In places used by many and unspecified people, such as stations and airports, it is preferable that surveillance be conducted to find leaving of suspicious objects and when a suspicious object is placed, such an object can be quickly found and removed.

To this end, a surveillance apparatus is provided that picks up images of a space under surveillance by using a surveillance camera and identifies a suspicious object from the surveillance images (Patent document 1).

CITATION LIST

Patent Document

[Patent document 1] Japanese Patent Laid-Open No. 2011-49646
[Patent document 2] Japanese Patent Laid-Open No. 2015-87882
[Patent document 3] Japanese Patent No. 4859879

SUMMARY

Technical Problem

Surveillance can be conducted by installing surveillance cameras in public spaces such as platforms of stations and lobbies of airports. However, a surveillance camera cannot be installed in a booth that is used in a closed state so that a user is not seen by a third party (hereinafter, also referred to as a target booth), such as a toilet booth, a changeroom, or a shower room, in order to ensure privacy, and it is therefore difficult to detect a suspicious object left behind in the target booth. Similarly, if an amenity is removed or damaged within a target booth, it is difficult to detect such occurrence. That is, in a target booth, it is difficult to build a system that detects abnormal affairs such as leaving of a suspicious object, removing of an amenity, and damaging of an amenity.

Accordingly, an object of the present invention is to provide a technology that performs security management while ensuring user privacy.

Solution to Problems

To solve the problems, a security management system according to the present invention includes: an object detection unit that detects a state of an object within a target booth; an abnormality determination unit that compares a result of the detection of the object with defined states and performs abnormality determination based on a result of the comparison; a shooting unit that shoots an inside of the target booth; and a video control unit that sets a resolution of a video signal to be outputted from the shooting unit based on a result of the abnormality determination.

In the security management system, the object detection unit detects a user who uses the target booth, and if the abnormality determination unit determines that a state of the user is abnormal when the user exists within the target booth, the video control unit may set the resolution of the video signal shot by the shooting unit lower than when the user does not exist within the target booth.

In the security management system, the object detection unit detects a user who uses the target booth, and if an action of the user detected by the object detection unit matches with a predetermined action among the defined states, the abnormality determination unit may determine an abnormality.

In the security management system, the object detection unit obtains location information on each of predetermined parts of the user, and the abnormality determination unit may perform the abnormality determination based on the location information on each of the parts of the user.

In the security management system, the object detection unit obtains movement information on each of predetermined parts of the user, and the abnormality determination unit performs the abnormality determination based on the movement information on each of the parts of the user.

The security management system further includes an entering and exiting detection unit that detects entering of a user into and exiting of the user from the target booth, and the abnormality determination unit may perform the abnormality determination by comparing a state detected by the object detection unit before entering of the user with a state detected by the object detection unit after exiting of the user.

In the security management system, the object detection unit may include: a projection unit that projects a predetermined projection pattern into the target booth; a deformation amount calculation unit that acquires a shot pattern by shooting the projection pattern projected into the target booth by using the shooting unit, and, for each location in a horizontal plane in the target booth, obtains a deformation amount of the shot pattern compared with a reference pattern, which is the projection pattern when the projection pattern is projected onto a plane at a predetermined height; and a state output unit that obtains height information on the object for each location in the horizontal plane based on the deformation amount of the shot pattern calculated by the deformation amount calculation unit, and outputs the height information on the object as the state of the object.

To solve the problems, in a security management method according to the present invention, a computer performs: detecting a state of an object within a target booth; comparing a result of the detection of the object with defined states and performing abnormality determination based on a result of the comparison; shooting an inside of the target booth by using a shooting unit; and setting a resolution of a video signal to be outputted from the shooting unit based on a result of the abnormality determination.

The present invention may be a security management program for causing a computer to execute the security management method. The security management program may be stored in a computer-readable storage medium.

Here, the computer-readable storage medium refers to a storage medium which stores information such as data and a program through electrical, magnetic, optical, mechanical, or chemical action and from which the information can be read by a computer. Among such storage media, storage media that are removable from a computer include, for example, a flexible disk, a magneto-optical disk, a CD-ROM, a CD-R/W, a DVD(R), a DAT, an 8 mm tape, a tape, a memory card, and the like. Storage media that are fixed to a computer include a hard disk, a ROM (read only memory), and the like.

Effects of the Invention

According to the present invention, it is possible to provide a technology that performs security management while ensuring user privacy.

BRIEF DESCRIPTION OF THE DRAWINGS

FIG. 10 illustrates an example of a condition table storing conditions for occurrence of an abnormality.

FIG. 18 illustrates examples of predetermined parts.

DESCRIPTION OF EMBODIMENTS

First Embodiment

Hereinafter, embodiments of the present invention will be described based on drawings. Note that the embodiments are examples of the present invention, and configurations of the present invention are not limited to the examples described below.

Figure 1:
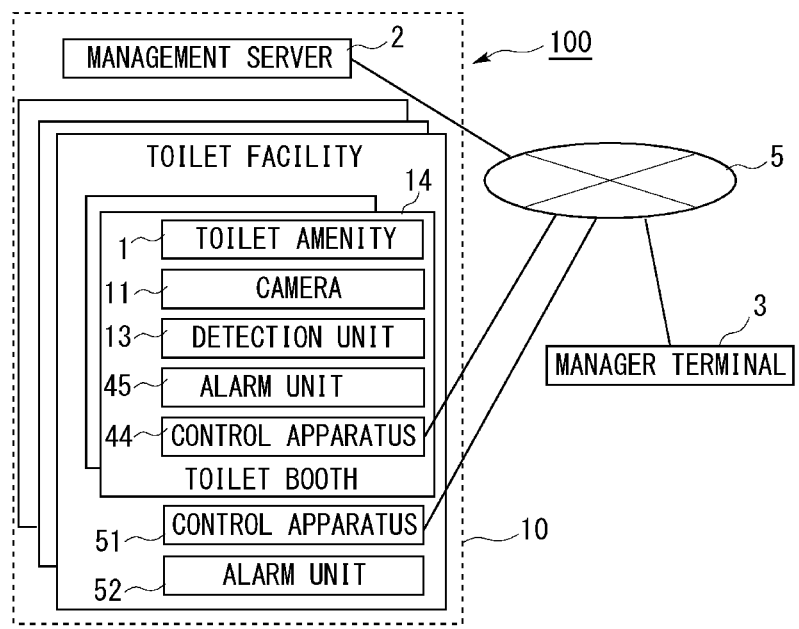
FIG. 1 illustrates a configuration of a security management system.

FIG. 1 illustrates a configuration of a security management system 100 according the first embodiment. The security management system 100 according to the present embodiment includes a camera (shooting unit) 11, a detection unit 13, a control apparatus 44, an alarm unit 45, and a management server 2, which are connected via a network 5 such as the Internet or a LAN (Local Area Network). The security management system 100 has a toilet booth (toilet stall) 14 provided in a toilet facility 10 as a management-target booth and, when an abnormality occurs in the toilet booth 14, such as when a user exits leaving behind a left-behind object, when a user damages a toilet amenity, when a user removes a toilet amenity, or when a user falls within the toilet booth, outputs an alarm indicating occurrence of the abnormality. The security management system 100 shoots an inside of the booth by using the camera 11 provided to the toilet booth and can identify a user who has caused the abnormality from a shot image. Further, the security management system 100 notifies information notifying the abnormality (abnormality notification information) to a predetermined notification destination, for example, a manager terminal 3 used by a manager that manages the toilet facility. Note that although FIG. 1 illustrates an example in which the security management system 100 does not include the manager terminal 3, the security management system 100 may include the manager terminal 3.

The toilet facility 10 is, for example, a public toilet used by many and unspecified users (the general public) in commercial facilities such as department stores, stations, and the like, and is provided in each of a plurality of buildings or on each of a plurality of floors in each building. The toilet facility 10 according to the present embodiment includes a plurality of the toilet booths 14, and each toilet booth 14 includes the detection unit 13 and the alarm unit 45. The detection unit 13 detects a state of a person or an object within the target booth. When it is determined that an abnormality has occurred, the alarm unit 45 outputs an alarm indicating occurrence of the abnormality.

Figure 2:
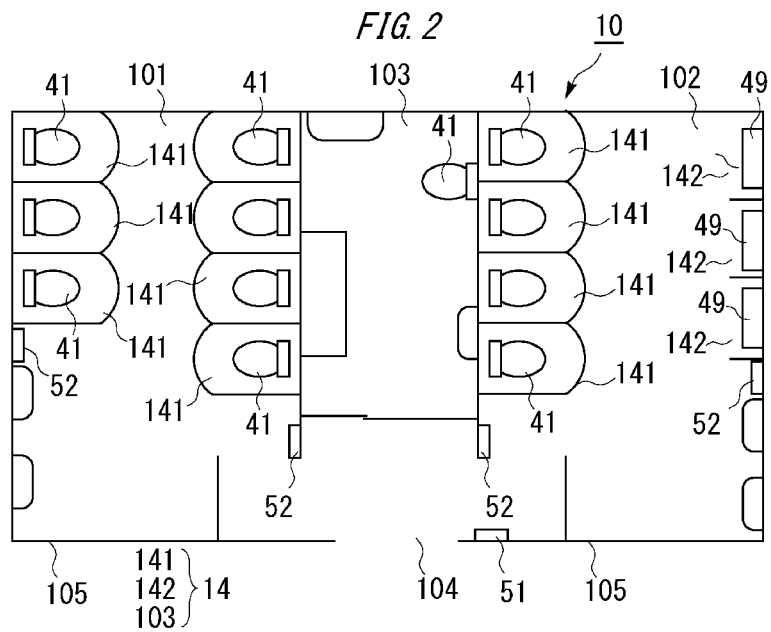
FIG. 2 illustrates an example of a toilet facility.

FIG. 2 illustrates an example of the toilet facility 10. As illustrated in FIG. 2, the toilet facility 10 is segmented into, for example, a female toilet facility 101, a male toilet facility 102, and a multi-use toilet facility 103. The toilet facility 10 is enclosed with faces of wall 105, except an entrance/exit 104. That is, a user who uses the toilet facility 10 enters and exits the toilet facility 10 through the entrance/exit 104. Note that the entrance/exit 104 is provided not only at a single place, but the entrance/exits 104 may be provided at a plurality of places. When an abnormality is detected, the control apparatus 44 of each toilet booth 14 notifies the abnormality to the management server 2. The female toilet facility 101 includes a plurality of toilet booths 141, each provided with a toilet bowl 41, and the male toilet facility 102 includes a plurality of the toilet booths 141, each provided with the toilet bowl 41, and a plurality of toilet booths 142, each provided with a urinal 49. The multi-use toilet facility 103 in FIG. 2 is a single toilet booth including an ostomy amenity and a baby bed, in addition to the toilet bowl 41. The multi-use toilet facility 103 is not limited to this, but may include a plurality of toilet booths. As described above, the toilet facility 10 according to the present embodiment includes, as the toilet booths 14, the toilet booths 141, each provided with the toilet bowl 41, the toilet booths 142, each provided with the urinal 49, and the multi-use toilet facility 103. Here, each toilet booth 14 is a space (cubicle) that is enclosed with a door, walls, and the like and is provided with toilet amenities 1 such as the toilet bowl 41, 49 for allowing a user to relieve nature in a solo state when the user uses the toilet booth 14. Note that each toilet booth 14 is not strictly limited to being used by a solo user but may allow a helper, a baby, or a toddler to come in together with a user at the same time. Each toilet booth 14 may be a space that is not completely enclosed, such as a space provided with a toddler toilet or a space provided with the urinal 49.

Figure 3:
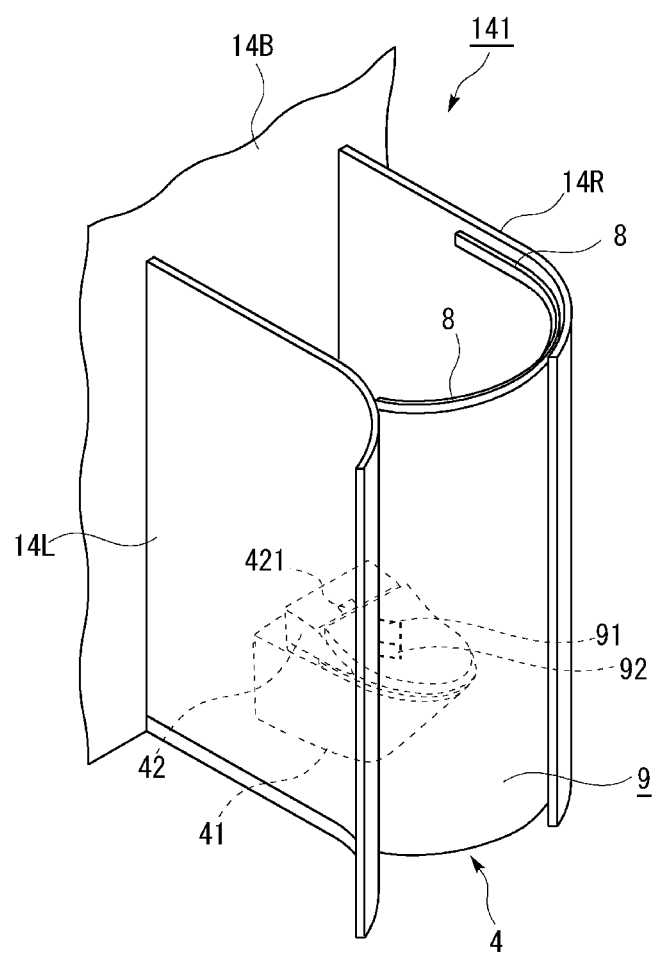
FIG. 3 is a perspective view illustrating a toilet booth.
Figure 4:
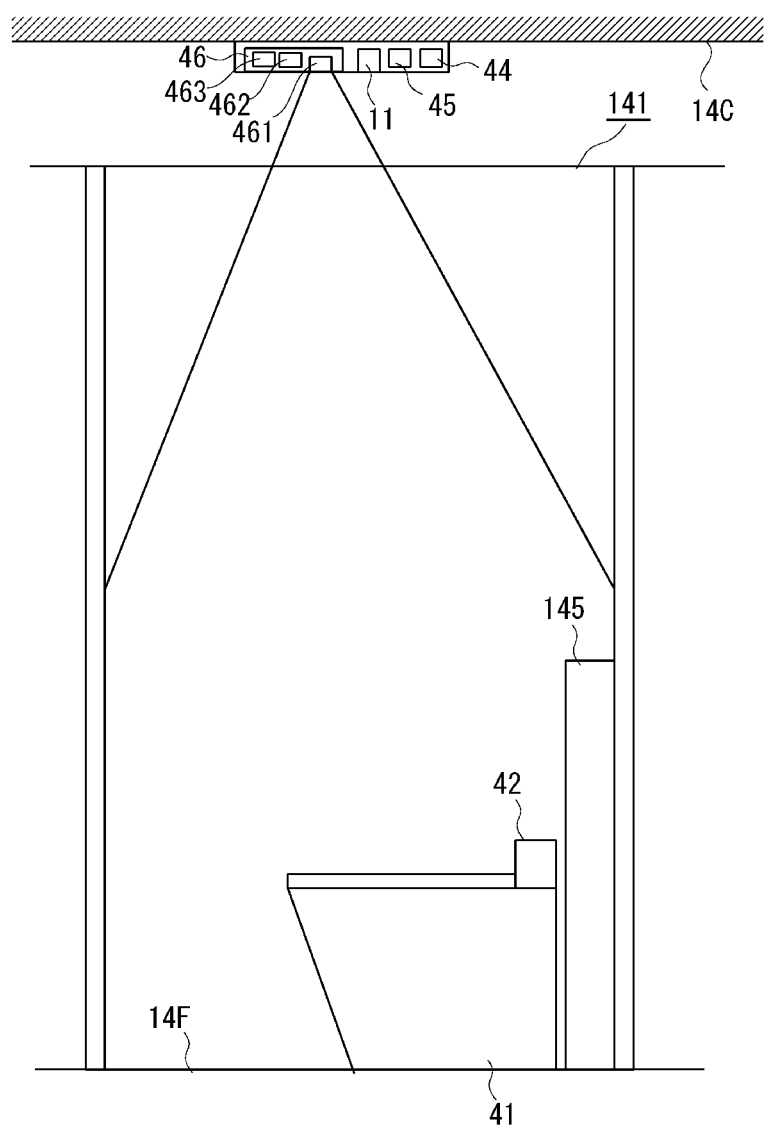
FIG. 4 is a front view illustrating the toilet booth.

FIG. 3 is a perspective view illustrating an example of one of the toilet booths 141 provided with the toilet bowl 41, and FIG. 4 is a front view illustrating the toilet booth 141. The toilet booth 141 is enclosed with a pair of right and left side walls 14L and 14R and a back wall 14B on three sides and, on a front, has a door 9 that opens and closes an entrance/exit 4 of the toilet booth 141. The toilet bowl 41 is installed within the toilet booth 141 enclosed with the side walls 14L and 14R, the back wall 14B, and the door 9. The walls 14L, 14R, and 14B and the door 9 enclosing the toilet booth 141 may have a height extending from a floor 14F to a ceiling 14C, but in the present embodiment, a space is provided between the ceiling 14C and each of the right and left side walls 14L and 14R and the door 9 as illustrated in FIG. 4, to allow air to circulate.

Here, right and left refer to a left side and a right side when the entrance/exit 4 is squarely faced from outside of the toilet booth 141, respectively, front and back refer to a front side and a back side when a user sits on the toilet bowl 41, respectively, and upper and lower refers to a ceiling 14C side (upper side) and a toilet bowl 41 installation face (floor) 14F side (lower side), respectively.

The right and left side walls 14L and 14R are boards, which are straight-line shaped on a back-end side and are curved leftward on a front-end side so that a transverse section (horizontal section) is J-shaped (see FIGS. 2 and 3). If the toilet booth 141 has adjacent toilet booths 141, the left side wall 14L concurrently serves as the right side wall 14R of one of the other toilet booths 141 on the left, and the right side wall 14R concurrently serves as the left side wall 14L of one of the other toilet booths 141 on the right.

One end of a guide rail 8 is provided on an inner upper portion of the right side wall 14R (see FIG. 3). The guide rail 8, the one end of which is supported by the right side wall 14R, passes over the entrance/exit 4, and the other end of the guide rail 8 is fixed to the left side wall 14L. Note that the guide rail 8 is also provided on a toilet-booth inner side of the left side wall 14L, which concurrently serves as the right side wall of the adjacent toilet booth 141 on the left, depiction of which is omitted in FIG. 3. The door 9 is installed in a state being suspended from the guide rail 8, and the entrance/exit 4 is opened and closed by moving the door 9 along the guide rail 8. Note that although the present embodiment illustrates an example in which the door 9 is curved and slid along the guide rail 8, the shape is not limited to this. The front face including the right and left side walls and the door may be made to be flat so that the shape of a horizontal section (the shape of a plane) of the toilet booth 141 is rectangular.

A lock 91 is provided on a left end portion of the door 9 to allow a user located within the toilet booth to perform locking and unlocking operations. When locked, the lock 91 engages with a catch (not illustrated) on the left side wall 14L and prevents the door opening. The lock 91 is not limited to the configuration that engages with the left side wall 14L, but only needs to keep closing the door 9. The lock 91 may have a configuration that engages with the right side wall 14R, or a configuration that engages with any other one of the guide rail 8, the floor 14F, and the ceiling 14C and is locked. Note that the lock 91 may be omitted if the door 9 is automatically opened and closed and if a configuration is made such that the door 9 is not operated to open before a user instructs to open the door. The door 9 also includes an opening/closing sensor 92 that detects whether or not the lock 91 is locked, or whether or not the door 9 is closed. A result of the detection by the opening/closing sensor 92 is used for determination as to whether or not the toilet booth 141 is in use. Accordingly, in the present embodiment, the opening/closing sensor 92 is one embodiment of the detection unit 13.

As illustrated in FIGS. 3 and 4, each toilet booth 141 includes the toilet amenities 1 such as the toilet bowl 41, a toilet seat apparatus 42, and a controller 43, the camera 11, an object detection unit 46, the control apparatus 44, and the alarm unit 45.

The camera 11 is provided on the ceiling 14C of each toilet booth 141 and shoots a bird's-eye view of the inside of the toilet booth from the ceiling side. In the present example, a configuration is made such that the single camera 11 is provided on the ceiling 14C, but is not limited to this. The camera 11 may be provided on the back wall 14B to direct a shooting lens to the door 9 side and shoots the front of a user entering the toilet booth 141. The camera 11 may be provided on the side wall 14L near the entrance/exit to direct the shooting lens to the back wall 14B side and shoots the front of a user exiting the toilet booth 141. The cameras 11 may be provided on a plurality of such places.

The toilet seat apparatus 42 is provided on the Western-style toilet bowl 41 and has a function of warming a seat on which a user sits and a cleaning function of ejecting warm water and cleaning an anus and a genital of a user. The toilet seat apparatus 42 includes a sitting sensor 421 that detects whether or not a user is sitting on the seat and, based on a result of the detection by the sitting sensor 421, performs control of enabling/disabling ejection so that warm water is ejected when a warm water ejection button (not illustrated) is pressed while the user is sitting on the seat, but warm water is not ejected even when the warm water ejection button (not illustrated) is pressed while the user is not sitting on the seat. Based on the result of the detection by the sitting sensor 421, the toilet seat apparatus 42 performs control of shifting to a power saving mode by lowering temperature of the seat when a user does not sit on the seat, and the like. A style of the toilet bowl 41 is not limited to the Western style, but may be a Japanese style. If the Japanese-style toilet bowl 41 is provided, the toilet seat apparatus 42 is omitted.

Figure 5:
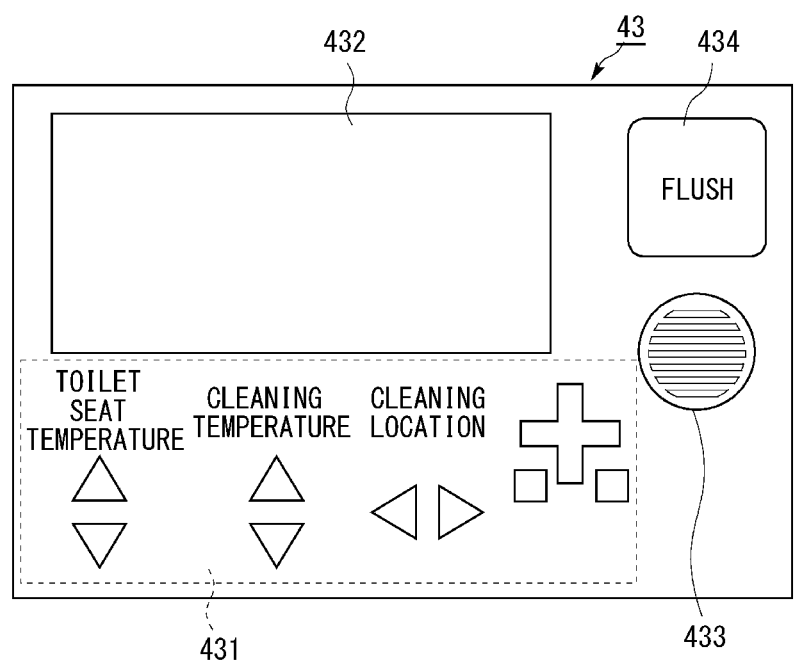
FIG. 5 illustrates an example of a controller.

The controller 43 includes an operation unit 431 on which a temperature setting, a cleaning location setting, and the like of the toilet seat apparatus 42 is operated, as illustrated in FIG. 5. The controller 43 also includes a display unit 432, a speaker 433, and a cleaning button 434. In addition, the controller 43 may also include buttons to input a use state (not illustrated) such as an emergency button, a fire alarm button, and a no abnormality button. The buttons may be so-called software keys that are displayed on the display unit 432 and selected by using a touch sensor or the operation unit 431. Note that the controller 43 may be assumed to be an embodiment of the detection unit 13, and operations on the cleaning button 434, the buttons to input a use state, and the like may be used to detect a state of a person (user) located within the target booth.

The display unit 432 displays a set temperature of the toilet seat, a temperature of the warm water for cleaning, and a cleaning location, and also displays information received from the control apparatus 44, and the like.

The speaker 433 outputs an operation sound when the operation unit 431 is operated, a sound related to an alarm, which will be described later, an imitative sound imitating a sound of cleaning water flushing the toilet bowl, and the like.

The cleaning button 434 is an operation button that is operated by a user when cleaning water is released to the toilet bowl 41. When the controller 43 detects that the cleaning button 434 is pressed, the controller 43 opens a flush valve (not illustrated) of the toilet bowl 41 and releases the cleaning water.

The alarm unit 45 outputs a sound or light as an alarm, based on an alarm notified from the management server 2. The alarm unit 45 is provided, for example, above the left, right side wall 14L, 14R in such a manner that a display unit 451 that displays light or a message as an alarm and a speaker 452 that outputs a sound as an alarm are directed to an outside of the toilet booth 141. That is, a configuration is made such that an alarm is informed not only to a user within the toilet booth but also to people around through a space between the side wall 14L, 14R and the ceiling 14C to let the people around know which toilet booth issues an alarm.

The object detection unit 46 detects states of objects such as the toilet amenities 1 and a user within the toilet booth 14. The object detection unit 46 in the present example includes a projection unit 461, a deformation amount calculation unit 462, and a state output unit 463. The camera 11 is also included as part of the object detection unit 46.

The projection unit 461 projects a predetermined projection pattern into the target booth. The projection unit 461 has, for example, a configuration that blocks part of a light beam from a light source by using a specific mask and projects an image of the mask onto a projection plane, or a configuration that guides the light beam from the light source into a line shape or dot shapes by using a mirror or an optical element such as a diffraction grading, and with such a configuration, forms a light and dark pattern on the projection plane. Note that the projection pattern is preferably formed by using non-visible light such as infrared light. The mask may be configured by using a liquid crystal display element, or the mirror may be configured by using a DMD (Digital Micromirror Device), so that a projection pattern can be dynamically changed.

The deformation amount calculation unit 462 acquires a shot pattern by shooting the projection pattern projected into the toilet booth by using the camera 11. Using the projection pattern that is projected onto a plane at a predetermined height as a reference pattern, the deformation amount calculation unit 462 calculates, for each location in a horizontal plane, a deformation amount of the shot pattern compared with the reference pattern.

Based on the deformation amount, the state output unit 463 calculates height information on an object onto which the projection pattern is projected, for each location in the horizontal plane, and outputs the height information as a state of the object. Note that details of how the state of the object is detected based on the projection pattern will be described later.

The object detection unit 46 detects location information on each body part of a user, that is, so-called skeletal information. For example, a position of a user can be detected by detecting locations of hands, arms, a head, a face, shoulders, a waist, legs, knees, feet, and the like of the user and based on locational relationship among the parts. More specifically, if the feet, knees, waist, shoulders, and head align in a vertical direction, it can be detected that the user is in a standing state. At this time, based on a direction of the face of the user, it can also be detected to which direction the user is standing. If the legs are bent and the waist is located on the seat of the toilet bowl, it can be detected that the user is sitting on the toilet bowl.

Further, the object detection unit 46 acquires the location information in a time series and detects movement information on each body part of the user. Thus, an action of the user can be detected. For example, an action of operating a smartphone with the smartphone held in a hand, an action of damaging a toilet amenity, such as hitting the toilet amenity at a predetermined speed or more, an action of touching the toilet bowl or a waste bin with both hands, an action of giving oneself an injection, an action of placing an object on a shelf, an action of removing clothes, and the like can be detected. Note that in the present example, a case of detecting that a user makes no action is also referred to as detection of an action of the user.

The detection unit 13 in the present example includes the opening/closing sensor 92, the in-booth controller 43, and the object detection unit 46, and in addition, may include a fire alarm and a motion sensor for the outside of the toilet booth.

Figure 6:
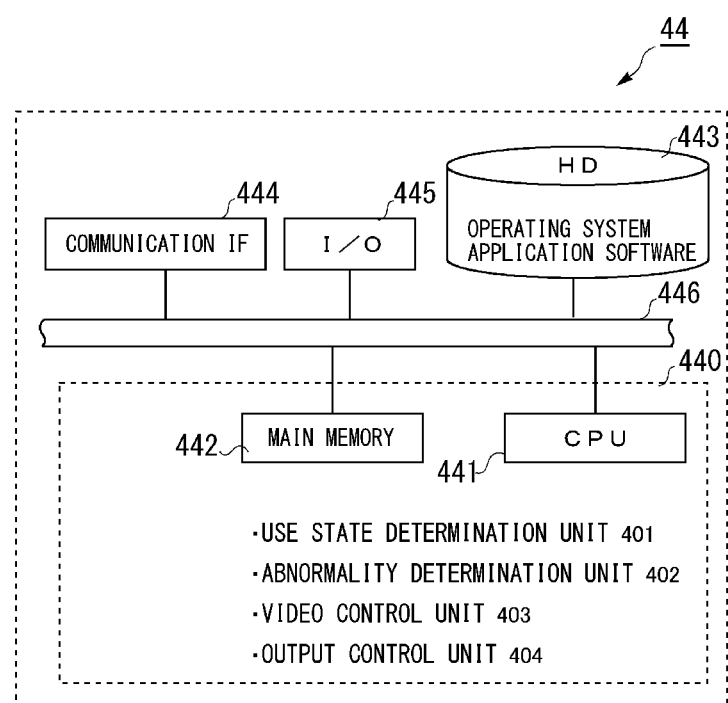
FIG. 6 illustrates a configuration of a control apparatus.

The control apparatus 44 is electrically connected to the alarm unit 45, the controller 43, the toilet seat apparatus 42, the object detection unit 46, and the like and controls the alarm unit 45 and the controller 43 based on information detected by the object detection unit 46. The control apparatus 44 is, for example, a computer including a processor unit 440, an auxiliary memory 443, a communication IF (Interface) 444, an input/output IF (Interface) 445, and a communication bus 446 as illustrated in FIG. 6.

The processor unit 440 includes a use state determination unit 401, an abnormality determination unit 402, a video control unit 403, and an output control unit 404. The processor unit 440 includes a Central Processing Unit (CPU) 441 and a main memory 442 and performs processing as each unit, such as the use state determination unit 401, the abnormality determination unit 402, the video control unit 403, and the output control unit 404, in accordance with a computer program developed in an executable form in the main memory 442. The CPU 441 is also referred to as MPU (Micro Processor Unit), microprocessor, or processor. The CPU 441 is not limited to a single processor, but may have a multi-processor configuration. The single CPU 441 connected using a single socket may have a multi-core configuration. Processing by at least part of the units may be performed by any other processor than the CPU 441, for example, by a dedicated processor such as a Digital Signal Processor (DSP), a Graphics Processing Unit (GPU), a math processor, a vector processor, or an image processing processor. Processing by at least part of the units may be implemented as an integrated circuit (IC), or any other digital circuit. At least part of the units may include an analog circuit. Integrated circuits include an LSI, an Application Specific Integrated Circuit (ASIC), and a Programmable Logic Device (PLD). PLDs include, for example, a Field-Programmable Gate Array (FPGA). The units may be a combination of a processor and an integrated circuit. Such a combination is referred to as, for example, MCU (Micro Controller Unit), SoC (System-on-a-chip), system LSI, chipset, or the like.

The use state determination unit 401 acquires a result of the detection by the detection unit 13 at a predetermined timing and, based on the result of the detection, determines whether or not the target booth is in use. For example, in the present embodiment, a configuration is made such that locking of the lock 91 or an operation of opening and closing the door 9 is performed in the toilet booth. Accordingly, when the opening/closing sensor 92 detects that the lock 91 is in a locked state or that the door 9 is in a closed state (the opening/closing sensor is in an ON state), the use state determination unit 401 determines that the toilet booth 141 is in a used state because a user is in the toilet booth 141. Conversely, when the opening/closing sensor 92 detects that the lock 91 is in an unlocked state or that the door 9 is in an opened state, the use state determination unit 401 determines that the toilet booth 141 is not in a used state. Not limited to this, the use state determination unit 401 may determine that the toilet booth 141 is in a used state when the sitting sensor 421 of the toilet seat apparatus detects a user, and may determine that the toilet booth 141 is not in a used state when the sitting sensor 421 does not detect a user. The use state determination unit 401 may determine that the toilet booth 141 is in a used state when the object detection unit 46 detects a user within the toilet booth, and may determine that the toilet booth 141 is not in a used state when the motion sensor does not detect a user.

The abnormality determination unit 402 acquires a result of the detection by the detection unit 13 at a predetermined timing, compares the result of the detection with defined states (for example, conditions for occurrence of an abnormality), and determines occurrence of an abnormality depending on whether or not the result of the detection meets a condition for occurrence of an abnormality, such as whether or not an action of a user detected by the detection unit 13 matches with a predetermined action among the defined states. FIG. 10 illustrates an example of a condition table 471 storing the conditions for occurrence of an abnormality. Note that in FIG. 10, the conditions are indicated by using a natural language for convenience of description, but are not limited to this. The conditions only need to be information determinable by the abnormality determination unit 402. For example, in the present embodiment, the conditions are set as instructions or data that can be processed by the processor unit 440 providing the function of the abnormality determination unit 402.

According to a condition 1 in FIG. 10, when a highest location of a body of a user detected by the object detection unit 46 is not higher than a threshold value H1 and the user makes no action for a predetermined time period T1 (for example, 10 seconds to one minute) or longer in the locked state (for example, the opening/closing sensor 92 is in an ON state), the abnormality determination unit 402 determines an abnormality because the user may fall on the floor. According to a condition 2 in FIG. 10, when the feet of a user are at a height not lower than a threshold value H2 from the floor in the locked state, the abnormality determination unit 402 determines an abnormality because the user may get on the toilet bowl or the like. According to a condition 3 in FIG. 10, when a state where the sitting sensor detects a user lasts a predetermined time period T2 (for example, 10 minutes) or longer and a part of the user, such as the hands or the head, makes no action or is paralyzed, the abnormality determination unit 402 determines an abnormality because the user may be unable to move due to a sudden illness or the like. According to a condition 4, when the sitting sensor does not detect a user and the locked state lasts for a predetermined time period T3 (for example, 15 minutes) or longer, the abnormality determination unit 402 determines an abnormality because the user may perform a conduct other than evacuation.

According to a condition 5, when the object detection unit 46 detects that a user keeps touching the toilet bowl or the waste bin with both hands for a predetermined time period 14 (for example, one minute) or longer and that the user does not make an action of removing clothes after entering, the abnormality determination unit 402 detects an abnormality because the user may set a spy camera or the like. In general, when a waste is disposed of, the waste is held with one hand and is put into a waste bin from an opening. If a waste bin has a lid, actions go as follows: the lid is opened with one hand, a waste is put in with the other hand, and the lid is closed. Therefore, an action of touching the waste bin with both hands for a long time does not happen. In contract, when a spy camera is set, work of holding the camera with one hand, fixing the camera with the other hand, and the like is carried out, so that the toilet bowl or the waste bin is touched for a relatively long time. Accordingly, an abnormality is determined by detecting such an action. Note that since a hand is not put deep into a toilet bowl or a waste bin, or a toilet bowl or a waste bin is not touched with a hand for a long time in general, an abnormality may be determined when an action of touching, not only with both hands, but with one hand for a predetermined time period or longer, or an action of putting a hand in deep is detected.

According to a condition 6, when it is detected that a user makes an action of putting a syringe on a belly, a thigh, or an arm and immediately thereafter makes an action of reaching a hand to the shelf or the waste bin, the abnormality determination unit 402 determines an abnormality because the user may place a needle of the syringe on the shelf or in the waste bin. For example, although it is no problem to perform self-injection of insulin or self-injection of adrenaline within a toilet booth, leaving of a needle after injection on the shelf or in the waste bin may cause an injury to another user and therefore is detected as an abnormality. In this case, although it is difficult to detect the needle itself by using the camera 11 because the needle is thin and small, it is estimated that the needle is left behind by detecting an action of the user who handles the injector.

According to a condition 7, when the fire alarm detects flame or smoke, the abnormality determination unit 402 determines an abnormality because a fire is possible.

The abnormality determination unit 402 compares results of detection of an object within the toilet booth 141 between before entering of the user and after exiting of the user and, when a difference occurs between before entering of the user and after exiting of the user, determines an abnormality. For example, as types of abnormality, leaving of a suspicious object, removing of an amenity, damaging of an amenity, and the like may be determined. According to a condition 8, if an object that has not existed before entering of a user exists after exiting of the user, the abnormality determination unit 402 determines that the object applies to leaving of a suspicious object. According to a condition 9, if an object that has existed before entering of a user does not exist after exiting of the user, the abnormality determination unit 402 determines removing of an amenity. According to a condition 10, if an object that has existed before entering of a user does not exist in part or is deformed after exiting of the user, the abnormality determination unit 402 determines damaging of an amenity. In the case of the condition 9, 10, an abnormality may be determined if a user makes an action of hitting or breaking down the object, or the like. Note that for movable amenities such as the waste bin and an extra supply of toilet paper, locations of the movable amenities are registered as movable objects, and even if such an object does not exist, after exiting of a user, at a location where the object has existed before entering of the user but if the object exists at another location, a normal movement may be determined and leaving of an amenity does not need to be determined. Then, the location of the movable object is updated to the moved location. In this case, changes in the location due to movement of the object may be detected in real time to track the location of the object by performing the detection of the object not only before entering of the user and after exiting of the user but also during use so that it can be reliably detected that the object has been moved. For amenities that can be moved within a predetermined range (for example, opened and closed), such as the lid of the toilet bowl and the toilet seat, movable ranges of the amenities are registered beforehand as predetermined-range movable objects, and even if such an object does not exist, after exiting of a user, at a location where the object has existed before entering of the user but if the object exists within a removable range of the object, a normal movement may be determined and removing or damaging of an amenity does not need to be determined. If the object is moved (exists) beyond the movable range, damaging of an amenity may be determined. Locations of consumable supplies such as toilet paper and threshold values of consumed amounts are registered beforehand, and even if such a consumable supply (object) that has existed before entering of a user does not exist after exiting of the user but if an amount of the consumable supply that does not exist is not greater than a threshold value of the consumable supply (for example, one to two pieces), removing of an amenity does not need to be determined. If the amount of the consumable supply that does not exist exceeds the threshold value, removing of an amenity may be determined.

Based on a result of the determination by the abnormality determination unit 402, the video control unit 403 sets a resolution of a video signal to be outputted from the camera 11 to others than the control apparatus 44 and the object detection unit 46. For example, when no abnormality occurs, a video signal of the camera 11 is transmitted to the control apparatus 44 and the object detection unit 46 but is not transmitted to the others, for example, the manager terminal 3. On the other hand, when the abnormality determination unit 402 determines an abnormality, a video signal shot by the camera 11 is transmitted to the manager terminal 3, whereby the manager can immediately check a situation within the toilet booth. At this time, if no user exists within the toilet booth, for example, if a left-behind object is detected after exiting of a user, a video signal shot by the camera 11 is supplied to the manager terminal 3 at an intact resolution. If a user exists within the toilet booth, for example, if it is determined that an action of a user is abnormal, a video signal shot by the camera 11 is supplied to the manager terminal 3 at a lowered resolution compared to the resolution in the case where no user exists. Here, lowering resolution refers to lowering a level of drawing an image of an object by reducing the number of pixels per unit area (for example, dpi) of the video signal, changing contrast, brightness, chromaticness, and sharpness, or the like. Note that in the present example, since it is only necessary that an image of a user should not be detailedly drawn so as to ensure user privacy, lowering resolution also includes making a portion recognized as a user obscure, pixelating or masking the portion recognized as a user, and replacing the portion recognized as a user with a silhouette image or an abstract graphic.

Based on a result of the determination by the abnormality determination unit 402, the output control unit 404 causes an output unit such as the controller 43 or the alarm unit 45 to output an alarm indicating occurrence of an abnormality when it is determined that the abnormality has occurred. The alarm here is, for example, a message, such as "An abnormality has occurred", displayed on the display unit 432 of the controller 43 or outputted in audio from the speaker 433. The alarm may be light or a sound indicating the alarm that is outputted from the display unit 432 or the speaker 433. A message to be outputted as an alarm may be registered for each type of abnormality, and a message corresponding to the type of an abnormality that has occurred may be outputted, such as "Something is left" in a case where a suspicious object is left behind, and "An amenity is removed. Bring the removed amenity back to an original position" in a case where an amenity is removed.

The main memory 442 is used for a cache of a program and data read by the CPU 441 and for a CPU work area. Specifically, the main memory 442 includes a RAM (Random Access Memory), a ROM (Read Only Memory), and the like.

The auxiliary memory 443 stores a program to be executed by the CPU 441, setting information, the condition table 471, and the like used in the present embodiment. Specifically, the auxiliary memory 443 includes an HDD or an SSD, a flash memory, and the like.

The communication IF 444 transmits data to and receives data from another computer apparatus. Specifically, the communication IF 444 includes a wired or wireless network card and the like. The input/output IF 445 is connected to an input/output device, and receives an input from a user of the computer and outputs information to the user. The input/output IF 445 in the present embodiment is connected to the controller 43 as the input/output device, and receives an input through the operation unit 431, makes a display output to the display unit 432, and makes an audio output to the speaker. The constituent elements as mentioned above are connected through the communication bus 446. Note that any of the constituent elements may be provided in plural numbers, and part of the constituent elements do not need to be provided. For example, although the control apparatus 44 may be provided for each toilet booth 141, a configuration may be made such that the single control apparatus 44 is provided for two or more of the toilet booths 141, abnormalities in the two or more toilet booths 141 are detected by the single control apparatus and transmitted to the management server 2, and an alarm is notified by the single control apparatus 44 to the controller 43 or the alarm unit 45 of each toilet booth 141.

FIGS. 3 and 4 illustrate the toilet booth 141 including the toilet amenities 1 such as the toilet bowl 41, and the multi-use toilet facility 103 similarly includes the toilet amenities 1 such as the toilet bowl 41, determines occurrence of an abnormality based on results of detection by the object detection unit 46 and the opening/closing sensor 92, and transmits abnormality detection information indicating detection of the abnormality to the management server 2.

Figure 7:
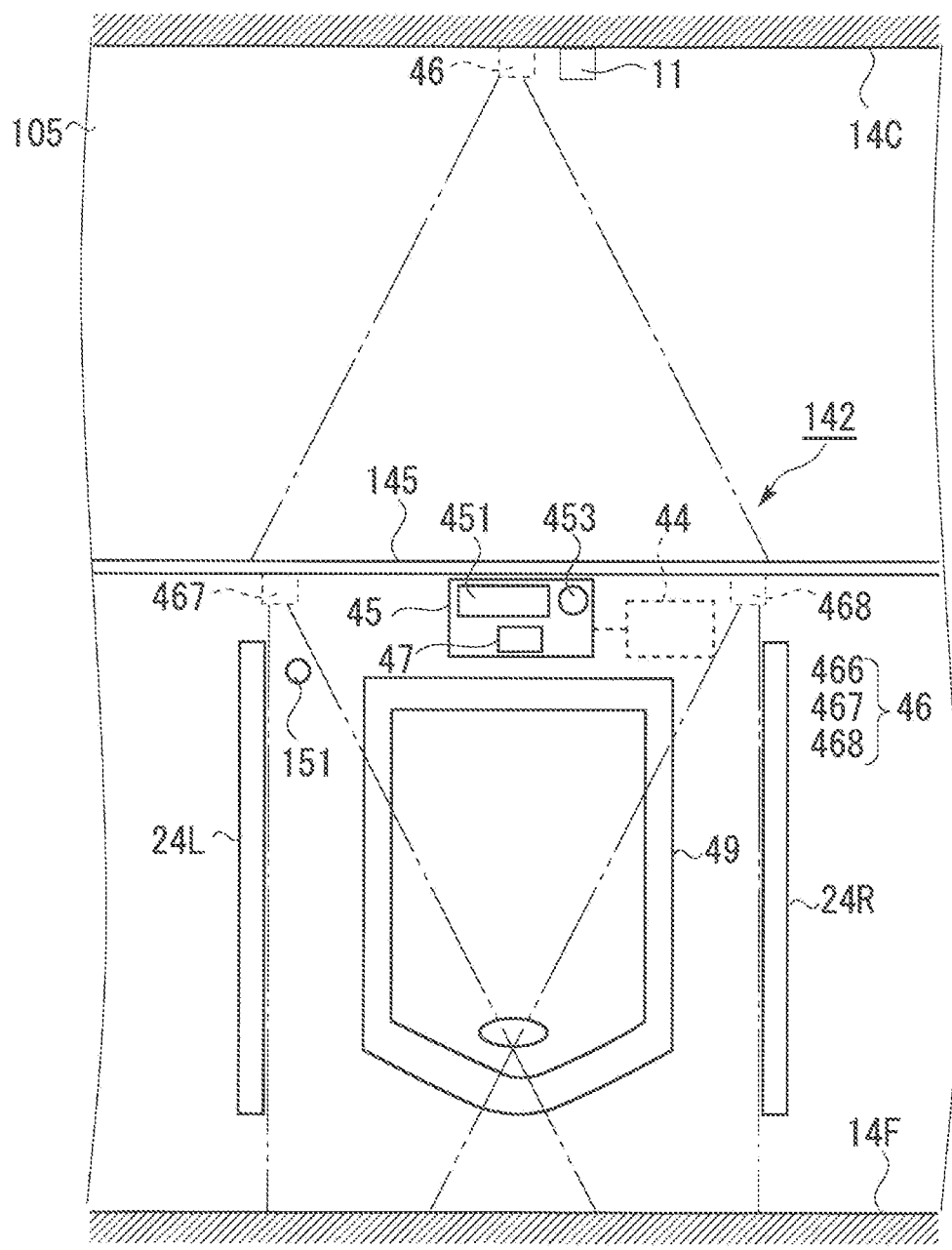
FIG. 7 illustrates a toilet booth including toilet amenities such as a urinal.

FIG. 7 illustrates one of the toilet booths 142 including the toilet amenities 1 such as the urinal 49 for males. The toilet booth 142 is partitioned by the ceiling 14C and the floor 14F in the vertical direction, and is enclosed on three sides in the horizontal direction by a pair of right and left side walls (partition boards) 24L and 24R and an installation face (wall) 105 for the urinal 49. That is, the toilet booth 142 has no wall in front of the urinal 49 and is not a completely enclosed space. However, when in use, a user stands in front of the urinal 49, and a space is created that is unsighted from others due to a back of the user and the side walls 24L and 24R. Accordingly, the space enclosed by the pair of the right and left side walls 24L and 24R and the wall 105 is referred to as the toilet booth 142. In FIG. 7, right and left refer to a right side and a left side when a user stands in front of the urinal 49, facing the urinal 49, respectively, front and back refer to a front side corresponding to a side of the urinal 49 that receives urine and a back side corresponding to a side of the urinal 49 that is attached to the wall 105, respectively, and upper and lower refer to the ceiling 14C side and the floor 14F side. Note that if the toilet booth 142 has adjacent toilet booths 142, the left side wall 24L concurrently serves as the right side wall 24R of one of the other toilet booths 142 on the left, and the right side wall 24R concurrently serves as the left side wall 24L of one of the other toilet booths 142 on the right. Note that the right and left side walls 24L and 24R may be omitted. If the right and left side walls 24L and 24R are omitted, for example, a predetermined area around the urinal 49 and in front of the urinal 49 is defined as the toilet booth 142.

The toilet booth 142 includes the toilet amenities 1 such as the urinal 49, the control apparatus 44, the alarm unit 45, the object detection unit 46, the camera 11, and a motion sensor (entering and exiting detection unit) 47. Note that the elements having approximately the same functions as the functions of the toilet booth 141 are denoted by the same reference numerals or the like, and a description thereof will be omitted. The wall 105 is a double wall having a space inside at least in a lower portion, and a water supply pipe and a drain pipe (not illustrated) are arranged in the space.

The urinal 49 is attached to the wall 105 and is connected to the water supply pipe and the drain pipe inside the wall 105. The motion sensor 47 is buried in the wall 105 above the urinal 49, detects a use when infrared is received from a user standing in front of the urinal 49, and detects that the user finishes evacuation and exits when no infrared becomes received from the user after the use is detected. The motion sensor is one embodiment of the entering and exiting detection unit that detects that a user enters the toilet booth 142 and squarely faces the urinal 49 and that the user moves away from the front of the urinal 49 and exits the toilet booth 142.

In the toilet booth 142, the alarm unit 45 is provided on the wall 105 above the urinal 49 in such a manner that the display unit 451 that displays light or a message as an alarm and a speaker 453 that outputs a sound as an alarm are directed frontward.

In the toilet booth 142, the object detection unit 46 detects an object within the toilet booth similarly to the object detection unit 46 of the toilet booth 141. For example, the object detection unit 46 is provided on the wall 105 in an upper portion of the toilet booth 142 or on the ceiling 14C, directed downward, and detects an object placed on a shelf 145 or the like formed on the wall 105 at a location higher than the urinal 49. The object detection unit 46 detects an object hung on a hook 151 formed on the wall 105 and an object placed on the floor or the like.

The control apparatus 44 is provided in the wall 105 and is electrically connected to the other toilet amenities 1 such as the alarm unit 45, the object detection unit 46, and the entering and exiting detection unit (motion sensor) 47. For example, when the control apparatus 44 detects, based on a result of the detection by the motion sensor 47, that a user exits after using the urinal 49, the control apparatus 44 performs control of opening a flush valve (not illustrated) connected to the urinal 49 to supply cleaning water from the water supply pipe and cleaning an inside of the urinal 49. The control apparatus 44 includes the CPU 441, the main memory 442, the auxiliary memory 443, the communication IF (Interface) 444, the input/output IF (Interface) 445, and the communication bus 446 as illustrated in FIG. 6, and the processor unit 440 provides the functions of units such as the use state determination unit 401, the abnormality determination unit 402, the video control unit 403, and the output control unit 404.

The toilet facility 10 includes a control apparatus 51 and an alarm unit 52, in addition to the toilet amenities 1 of each toilet booth 14. The control apparatus 51 is electrically connected to the alarm unit 52 and receives an alarm from the management server 2 and abnormality detection information from the control apparatus 44 of each toilet booth 14 via the network 5. A hardware configuration of the control apparatus 51 is similar to the configuration of the control apparatus 44 of each toilet booth 14, and includes the CPU 441, the main memory 442, the auxiliary memory 443, the communication IF (Interface) 444, the input/output IF (Interface) 445, and the communication bus 446 as illustrated in FIG. 6.

The control apparatus 51 causes the alarm unit 52 to output an alarm when abnormality detection information is received from the control apparatus 44 of each toilet booth or when an alarm is received from the management server 2. The alarm here is information notifying occurrence of an abnormality to a user.

Figures 8, 9:
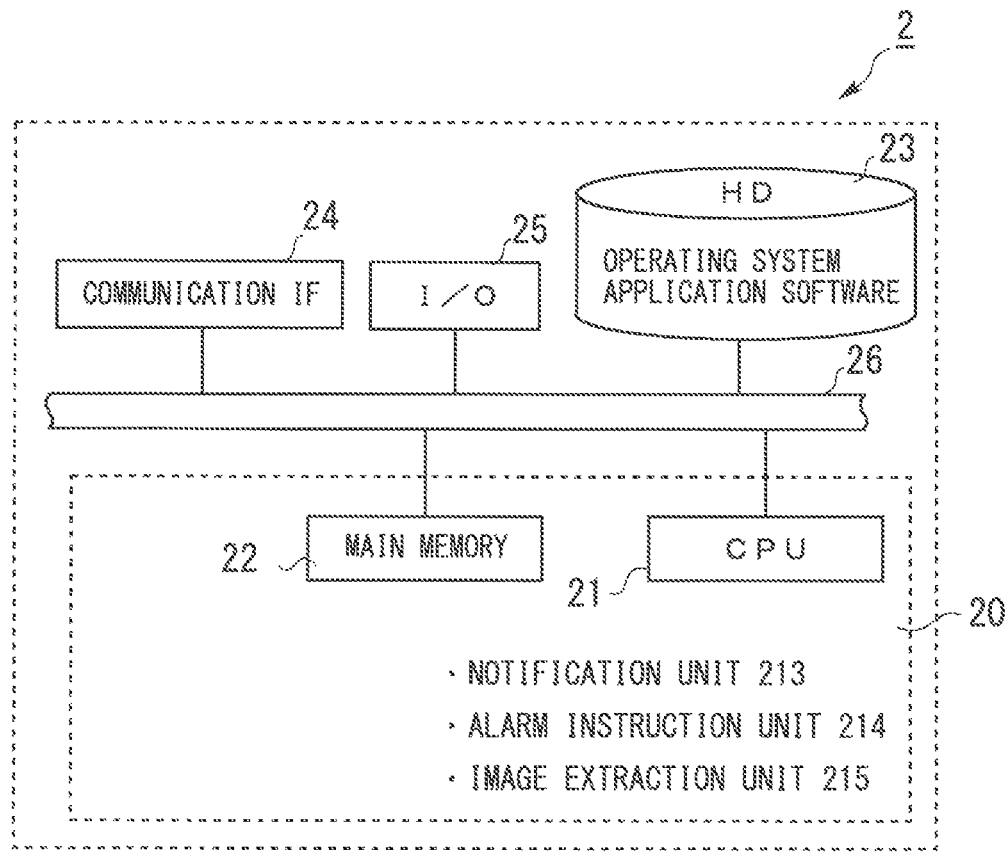
FIG. 8 illustrates a configuration of a management server.
FIG. 9 illustrates an example of a facility information table.

FIG. 8 illustrates a hardware configuration of the management server 2. The management server 2 is a so-called computer including a processor unit 20, an auxiliary memory 23, a communication IF (Interface) 24, an input/output IF (Interface) 25, and a communication bus 26.

The processor unit 20 includes a CPU 21 and a main memory 22. The main memory 22 is used for a cache of a program and data read by the CPU 21 and for a work area for the CPU 21. Specifically, the main memory 22 includes a RAM (Random Access Memory), a ROM (Read Only Memory), and the like.

The communication IF 24 transmits data to and receives data from another computer apparatus. Specifically, the communication IF 24 includes a wired or wireless network card and the like. The input/output IF 25 is connected to output means such as a display apparatus and a printer, input means such as a keyboard and a pointing device, and input/output means such as a drive device as appropriate. The drive device is a writing/reading device for a removable storage medium, and examples include an input/output device for a flash memory card, a USB adapter for connecting a USB memory, and the like. The removable storage medium may be, for example, a disk medium such as a CD (Compact Disc) or a DVD. The drive device reads a program from the removable storage medium and stores the program in the auxiliary memory 23.

The auxiliary memory 23 stores a program to be executed by the CPU 21, setting information used in the present embodiment, and the like. Specifically, the auxiliary memory 23 includes an HDD or an SSD, a flash memory, and the like. The auxiliary memory 23 transmits data to and receives data from the drive device. For example, the auxiliary memory 23 stores a program installed from the drive device, and the like. The auxiliary memory 23 reads a program and passes the program to the main memory 22. Further, the auxiliary memory 23 stores a facility information table.

The CPU 21 executes a program developed in an executable form in the main memory 22 and provides the functions of a notification unit 213 and an alarm instruction unit 214.

The alarm instruction unit 214 receives abnormality detection information from the output control unit 404 of each toilet booth 14 and causes the alarm unit 52 to output an alarm corresponding to the abnormality detection information. For example, a display output or an audio output of a message notifying existence of a left-behind object, such as "Something is left", or a message notifying occurrence of an abnormality, such as "An amenity is removed. Bring the removed amenity back to an original position", is made. Note that if information indicating a location of each toilet booth (location information) is stored in the facility information table beforehand and if the abnormality detection information includes identification information, location information of a toilet booth 14 corresponding to the identification information may be extracted from the facility information table, the location information, such as "x-th booth from the front", may be added to a message, and an output, such as "Something is left in the x-th booth from the front", may be made.

FIG. 9 illustrates an example of the facility information table. The facility information table stores identification information on each toilet facility 10, identification information on each toilet booth 14, and location information indicating a location of each toilet booth 14 within the toilet facility in association with each other.

The identification information on each toilet facility 10 is information for uniquely identifying each toilet facility if the management server 2 manages a plurality of toilet facilities. The identification information on each toilet booth 14 is information for uniquely identifying each toilet booth among the plurality of toilet booths 14 managed by the management server 2. The location information on each toilet booth 14 is information explaining in which toilet booth 14 an abnormality occurs when an alarm is issued, such as "x-th booth from the front" or "x-th booth from the back left". Note that the location information only needs to indicate a toilet booth 14 where an abnormality occurs, and may indicate, for example, a displayed form of the alarm unit, such as "a booth with an above alarm light illuminated" or "a urinal with a front panel blinking".

<Security Management Method>

Figure 11:
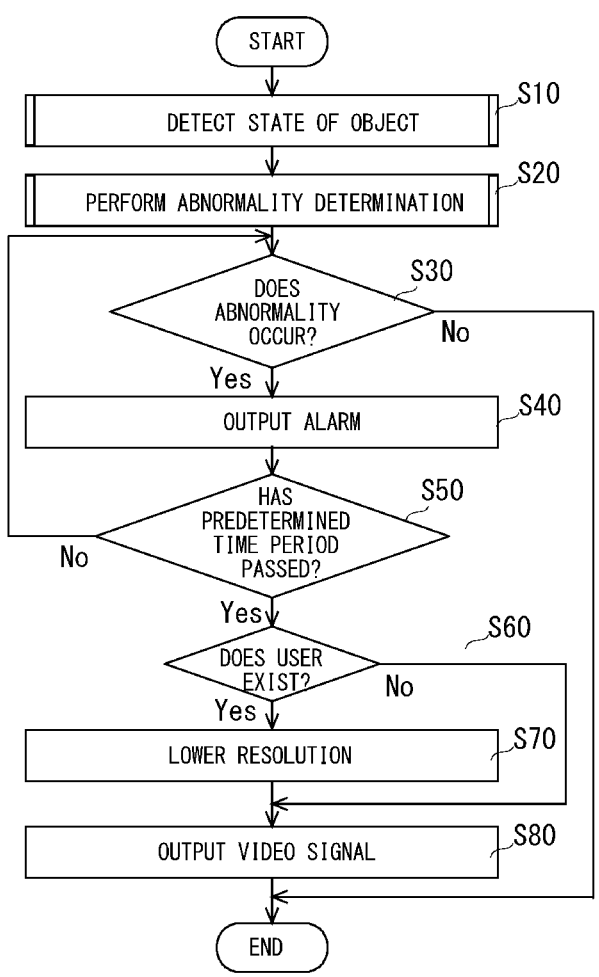
FIG. 11 is an explanatory diagram of a security management method.

FIG. 11 illustrates processing of detecting an abnormality and issuing an alarm, by the control apparatus 44 of each toilet booth 14. The control apparatus 44 repeatedly performs the processing in FIG. 11 periodically or at a predetermined timing and first, through the detection unit 13, detects a state of an object within the toilet booth 14, such as the toilet amenities and a user (step S10).

Next, the control apparatus 44 determines whether or not an abnormality occurs, based on whether or not a result of the detection by the detection unit 13 meets a condition in the condition table 471 (step S20). Here, if it is determined that an abnormality does not occur (step S30, No), the processing in FIG. 11 is terminated. If it is determined that an abnormality occurs (step S30, Yes), an alarm indicating occurrence of the abnormality is outputted (step S40).

The alarm here includes an alarm sound or a message outputted from the controller 43 or the alarm unit 45, a notification to the management server 2, a notification to the control apparatus 51, and the like. In this stage, a notification to the manager terminal 3 is not needed. That is, in step S40, the controller 43 or the alarm unit 45 in the toilet booth in which the abnormality is determined are caused to output the alarm, or the alarm unit 52 is caused to output the alarm by the control apparatus 51 in a toilet facility 10 in which the toilet booth 14 exists. Note that if an abnormality is detected when a user exists within the toilet booth as the conditions 1 to 4 in FIG. 10, the notifications to the management server 2 and the control apparatus 51 are not needed.

Then, the control apparatus 44 determines whether or not a predetermined time period has passed since the abnormality occurred (step S50). If the predetermined time period has not passed (step S50, No), the control apparatus 44 goes back to step S10, acquires a result of determination by the detection unit 13 again, and determines whether or not an abnormality occurs (step S20). For example, even if leaving of a suspicious object is detected but if a user only forgets to bring the object, the abnormality may be resolved in some times by outputting an alarm, such as "Something is left", in step S40 because the user is reminded of the object left behind and comes back to bring the object.

Even in a case that applies to the condition 3, a user only has a rest within a toilet booth in some cases. Accordingly, an alarm, such as "If you feel ill, staff will be called. If you do not need, press the [no help] button", is outputted in step S40 so that if no abnormality occurs, the user is guided to make an input to the effect that no abnormality occurs from the controller 43. Note that if the input to the effect that no abnormality occurs is made, the control apparatus 44 determines no abnormality, regardless of a result of the detection by the detection unit 13.

Note that when an alarm is outputted, a timing of outputting the alarm to the controller 43 or the alarm unit 45 may differ from a timing of notifying the alarm to the management server 2. For example, when an abnormality is detected, the controller 43 or the alarm unit 45 may be first caused to output an alarm, and thereafter the alarm (abnormality notification information) may be notified to the management server 2 and the control apparatus 51 if the abnormality is not resolved at a time point when a predetermined time period (shorter than the time period in step S50) has passed, but the alarm is not notified to the management server 2 if the abnormality is resolved.

Then, if it is determined in step S50 that the predetermined time period has passed (step S50, Yes), the control apparatus 44 determines whether or not a user exists within the toilet booth (step S60). Here, if a user exists within the toilet booth (step S60, Yes), the resolution of a video signal to be transmitted from the camera 11 to the manager terminal 3 is set lower (step S70), and the video signal with the lowered resolution is transmitted to the manager terminal 3 via the management server 2 (step S80). Note that if it is determined in step S60 that a user does not exist within the toilet booth (step S60, No), the video signal outputted from the camera 11 is transmitted to the manager terminal 3 via the management server 2 without changing the resolution (step S70).

Thus, the manager can notice an abnormality that occurs in a toilet facility and can check a situation of the abnormality from a video from the camera 11.

<Method of Detection by the Object Detection Unit 46>

Figure 12:
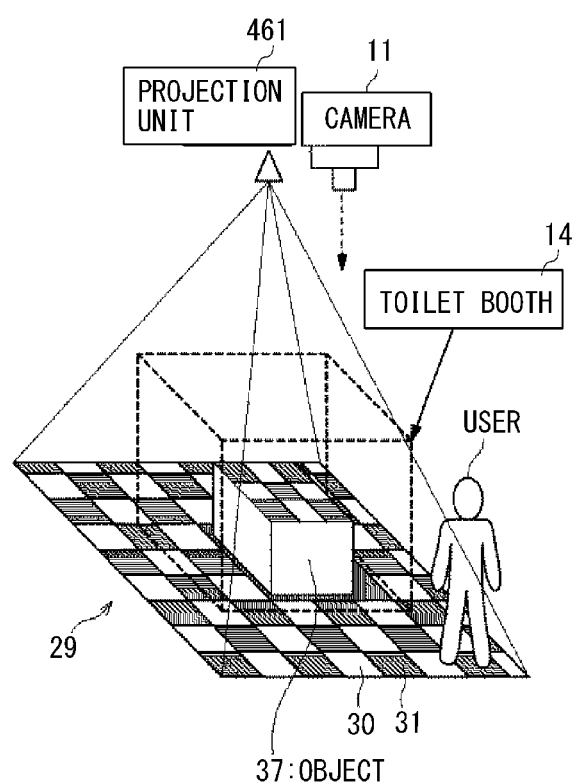
FIG. 12 is an explanatory diagram of a situation in which an object detection unit is installed.

FIG. 12 illustrates a situation in which the object detection unit 46 in the present example is installed. FIG. 12 illustrates the situation in which an object 37 exists within one of the toilet booths 14, in order to facilitate understanding of the situation in which the object detection unit 46 is applied. The object 37 is a target object, such as a toilet amenity or a user, a situation of which is to be detected.

The projection unit 461 is installed in vicinity of the toilet booth 14. A place where the projection unit 461 is installed is, typically, the ceiling 14C of a building in which the toilet booth 14 is provided. The projection unit 461 projects a projection pattern 29 in a direction to the toilet booth 14. In the example of FIG. 12, the projection pattern 29 is projected to a lower side in the toilet booth 14 where the object 37 exists.

The projection pattern 29 illustrated in FIG. 12 is a checkered pattern including light portions 30 and dark portions 31 that are alternately arranged. In a typical example, infrared with a predetermined brightness is projected for the light portions 30, and infrared is not projected for the dark portions 31. The periodically light and dark projection pattern 29 is formed due to a difference in the brightness of infrared. In place of the difference in the brightness, the projection pattern 29 can be formed by using another method, such as projecting electromagnetic waves with different wavelengths for the light portions 30 and the dark portions 31. That is, the projection pattern 29 is formed in such a manner that a first area having a first optical characteristic amount and a second area having a second optical characteristic amount are alternately arranged.

The projection pattern 29 is not limited to the checkered pattern, but may be any other type of pattern as long as the pattern is a repeated pattern (tiled pattern). For example, a pattern may be used that infills a predetermined area in such a manner that triangle light portions and dark portions are alternately arranged. Such a pattern includes first areas and second areas corresponding to the light portions 30 and the dark portions 31 in FIG. 12, respectively. It is preferable that each first area and each second area both have a closed outline, in the point that it is easy to generate a break-extraction image.

The camera 11 is provided on the ceiling next to the projection unit 461 and generates video signal by shooting the projection pattern 29 in a time series. The video signal is a moving image or a group including still images as elements that are shot at predetermined time intervals.

Figure 13:
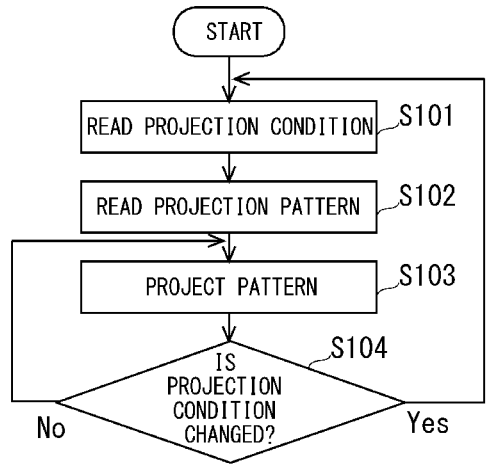
FIG. 13 illustrates operations of a projection unit.

As illustrated in FIG. 13, the projection unit 461 reads a projection condition such as a brightness from the memory (step S101) and reads the projection pattern 29 from the memory (step S102). The projection unit 461 to project the read projection pattern 29 (step S103). The projection unit 461 monitors whether or not an instruction to change the projection condition is sent from a CPU 19 (step S104). If there is no change in the projection condition, projection of the projection pattern 29 is continued. On the other hand, if the projection condition is changed, the projection unit 461 goes back to step S101, and projects the pattern in accordance with a new projection condition.

Figure 14:
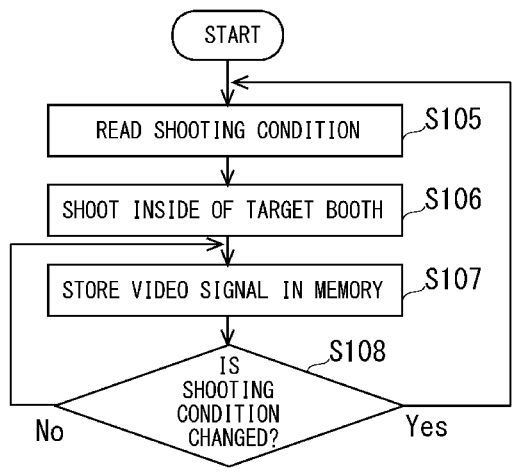
FIG. 14 illustrates operations of a shooting unit.

FIG. 14 illustrates operations of the camera 11. The camera 11 reads shooting conditions, such as a sensitivity, a diaphragm, a focus, and a timing of shooting, from the memory (step S105). The camera 11 shoots the inside of the toilet booth 14 in accordance with the shooting conditions and generates a time-series image (video signal) (step S106). The video signal is sequentially stored in a memory within the camera 11 (step S107). At this time, a time of day of shooting is also stored together. The camera 11 monitors whether or not an instruction to change the shooting conditions is sent from the CPU 19 (step S108). If there is no change in the shooting conditions, shooting is continued on an as-is basis. On the other hand, if any of the shooting conditions is changed, the camera 11 goes back to step S105, and performs shooting in accordance with new shooting conditions. Shooting by the camera 11 is always performed in parallel with projection of the projection pattern 29 by the projection unit 461 during a period of monitoring the toilet booth 14. Note that in order to save power, the period of monitoring may be a case where the opening/closing sensor is turned on, that is, a duration for which a user is in the toilet booth 14. As described above, the projection pattern projected into the toilet booth 14 by the projection unit 461 is shot by the camera 11 and is stored as a shot pattern in the memory.

The camera 11 may generate a binarized video signal by binarizing the shot video signal by using a first threshold value close to a brightness of the light portions 30 and a second threshold value close to a brightness of the dark portions 31. In this case, it is the binarized video signal that is stored in the video signal memory and is subjected to subsequent processing. Binarizing an image is preferable in terms of privacy protection because first, accuracy in the processing described below is enhanced, and second, a clear image of a subject of a shot is not seen.

Figure 15:
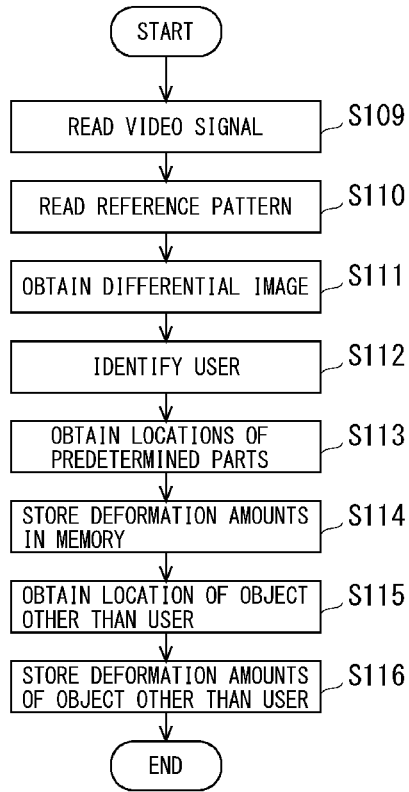
FIG. 15 illustrates operations of a deformation amount calculation unit.

FIG. 15 illustrates operations of the deformation amount calculation unit 462. The deformation amount calculation unit 462 reads the video signal stored in the memory of the camera 11 in real time (step S109). In the present example, reading is performed by extracting, from a moving image (video signal) shot by the camera, frames (one-frame images) included in the moving image at predetermined time intervals. If the video signal shot by the camera 11 is still images shot at predetermined time intervals, a latest still image may be sequentially read. The deformation amount calculation unit 462 reads a reference pattern from the memory (step S110). The reference pattern is a pattern corresponding to the projection pattern projected onto a plane at a reference height. For example, a pattern shot by the camera 11 when the projection pattern is projected onto a plane at a height of the floor is regarded as the reference pattern.

Figure 17:
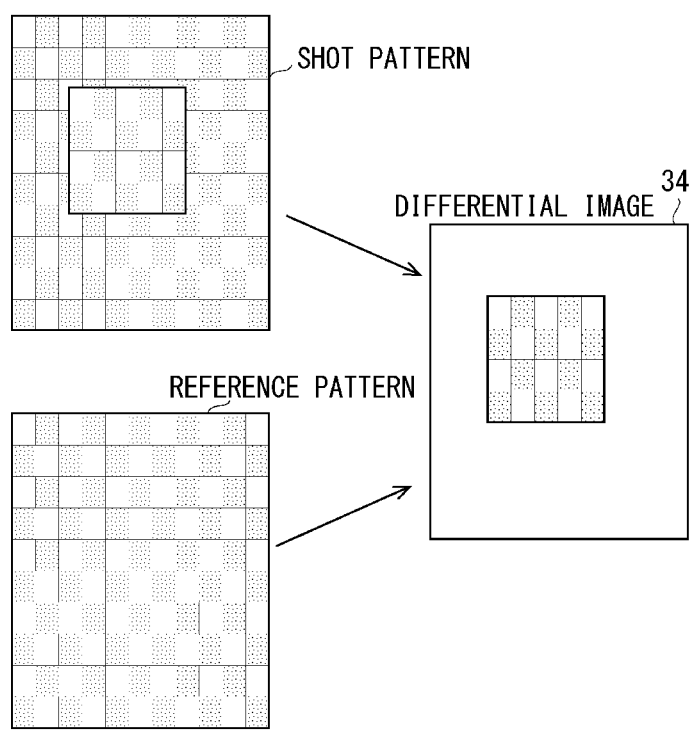
FIG. 17 illustrates an example of a differential image.

The deformation amount calculation unit 462 compares a shot pattern shot in each frame included in the video signal with the reference pattern that is the projection pattern projected onto the plane at the predetermined height, and obtains a differential image (step S111). The projection pattern in the present example is projected in such a manner as to enlarge from the projection unit 461 provided on the ceiling 14C toward the floor. Accordingly, the light portions 30 and the dark portions 31 included in the projection pattern are projected in such a manner as to be larger on the floor side and smaller on the ceiling side. Since the projection unit 461 that projects the projection pattern and the camera 11 that shoots the projection pattern are disposed apart at a predetermined distance, deviations arise in the light portions 30 and the dark portions 31 projected onto the object 37, compared with the light portions 30 and the dark portions 31 projected onto the floor plane. Accordingly, the plane assumed to be located at the reference height (for example, the height of the floor) is regarded as a reference plane, the projection pattern projected onto the reference plane is regarded as the reference pattern, the shot pattern and the reference pattern are compared, and deviations are extracted as an image of the object existing within the toilet booth (differential image). FIG. 17 illustrates an example of the differential image. For example, a differential image 34 is generated by calculating, for each pixel, an absolute value of a difference between the shot pattern and the reference pattern. The differential image 34 is a binary image including white pixels corresponding to the light portions 30 and black pixels corresponding to the dark portions 31.

The deformation amount calculation unit 462 identifies a portion where the user appears in the differential image 34 by pattern matching (step S112). For example, shapes and sizes of a head, shoulders, legs, and the like that can be obtained when the camera 11 shoots a user within the toilet booth 14 are stored as standard patterns beforehand, and portions that match with the standard patterns in the differential image are identified as an image of the user. Further, the deformation amount calculation unit 462 identifies predetermined parts (body elements), such as a head, a chest, arms, and legs, in the image of the user. FIG. 18 illustrates examples of the predetermined parts. As illustrated in FIG. 18, in the present example, a head A1, shoulders A2 and A3, upper arms A5 and A8, forearms A6 and A9, hands A7 and A10, a chest A11, a belly A12, a back A21, a waist A22, thighs A13 and A17, knees A14 and A18, lower legs A15 and A19, and feet A16 and A20 are identified as the predetermined parts. For example, respective standard shapes and sizes of the predetermined parts are stored as predetermined part patterns, and the predetermined parts of the user are identified by obtaining portions that match with the predetermined part patterns from the image of the user, and based on positional relationships among the predetermined parts, such as a neck and shoulders connecting to a head and arms being located at both sides of shoulders, respectively.

The deformation amount calculation unit 462 obtains a location of each predetermined part in a horizontal plane (step S113). The deformation amount calculation unit 462 obtains a deformation amount of the shot pattern for each predetermined part and stores the deformation amounts in the memory along with the respective locations in the horizontal plane (step S114).

The deformation amount calculation unit 462 obtains a location of a portion other than the user, that is, an object other than the user in the horizontal plane, in the differential image (step S115). At this time, if a plurality of objects are detected, a distinction is made among the objects by giving an ID to each object, and respective locations of the objects are obtained. The deformation amount calculation unit 462 obtains a deformation amount of the shot pattern for the object other than the user in the differential image, and stores the deformation amount in the memory along with the location in the horizontal plane (step S116).

Figure 16:
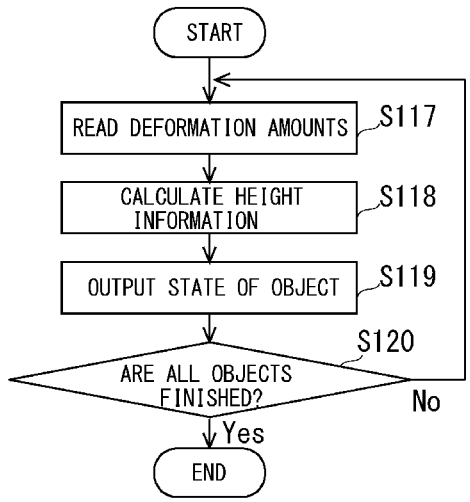
FIG. 16 illustrates operations of a state output unit.

FIG. 16 illustrates operations of the state output unit 463. The state output unit 463 sequentially reads the location of each object in the horizontal plane and the associated deformation amount calculated by the deformation amount calculation unit 462 from the memory (step S117).

The state output unit 463 calculates height information on each object based on the deformation amount of the shot pattern for the object (step S118) and outputs the location in the horizontal plane and the height represented, for example, by coordinates on a three-dimensional coordinate system, as a locational state of the object (step S119). This is repeated for each object (step S120) and is performed for each of temporally consecutive frames, whereby changes in the location of each object make movement information.

Figure 19:
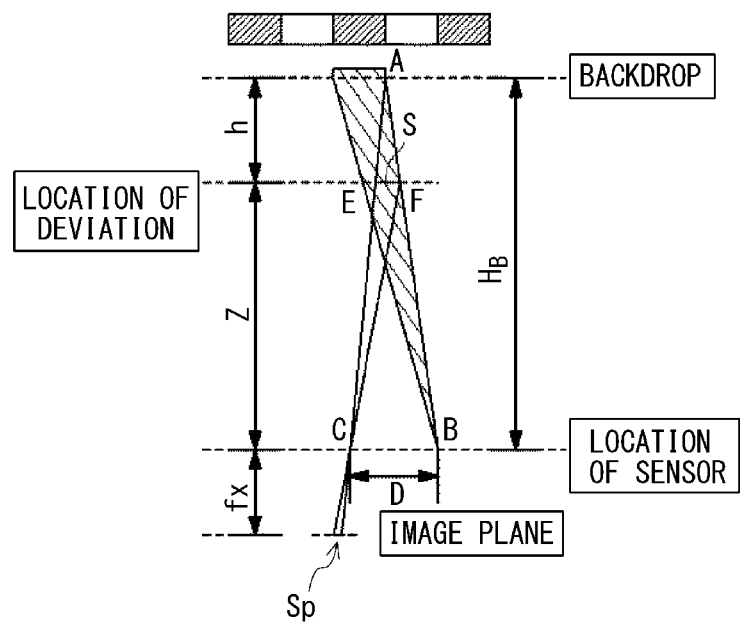
FIG. 19 is an explanatory diagram of a method of calculating a height of an object based on a deviation amount of a shot pattern.

FIG. 19 is a diagram for explaining a method of calculating a height of the object 37 based on a deviation amount of the shot pattern (FIG. 12). A point B represents a location of the projection unit 461. A point C represents a location of a lens (sensor) of the camera 11 or a location corresponding to a pinhole in a case of an optical system of a pinhole camera. The point B and the point C are assumed to have a same height relative to the floor plane, and a distance between the point B and the point C in the horizontal plane is assumed to be D. A distance from the point C to an image plane where an image is formed in the camera 11 is assumed to be fx. A distance between each of the projection unit 461 and the camera 11 and the floor plane is assumed to be HB. The distance HB is registered in the memory of the object detection unit 46 beforehand. A distance from the floor plane to an upper face of the object 37 is assumed to be h. A distance between the upper face of the object 37 and the sensor is Z=HB−h.

The projection unit 461 projects the projection pattern 29 from the point B toward the floor plane. A location where any one of the predetermined parts in the projection pattern 29 would be projected on the floor plane if the object 37 did not exist (a location on the reference plane) is assumed to be a point A. The amount of a deviation of the pattern 29, which is caused by the pattern 29 being projected onto the upper face of the object 37, in the image plane in the camera 11 (detected from deviation measurement images 80 and 82) is assumed to be Sp. The amount of an actual deviation of the pattern 29 on the upper face of the object 37 (the amount of a deviation of the predetermined part in the pattern 29 between in a case where the object 37 exists and in a case where the object 37 does not exist), which causes Sp, is assumed to be S. In this case, the following equation is satisfied:

$$S_p = f_X \frac{S}{Z} \qquad (1)$$
$$\Leftrightarrow S = \frac{S_p}{f_X} Z = \frac{S_p(H_B - h)}{f_X}$$
$$(\because Z = H_B - h)$$

On the other hand, in a triangle ABC, the following equation is satisfied from a relationship between a triangle and a parallel line:

$$S = \frac{Dh}{H_B} \qquad (2)$$

Based on the equations (1) and (2), the height of the object 37 from the floor plane can be obtained by the following equation:

$$h = \frac{S_p H_B^2}{f_X D + S_p H_B} \qquad (3)$$

The object detection unit 46 can calculate the height of the object 37 through such calculation.

Figure 20:
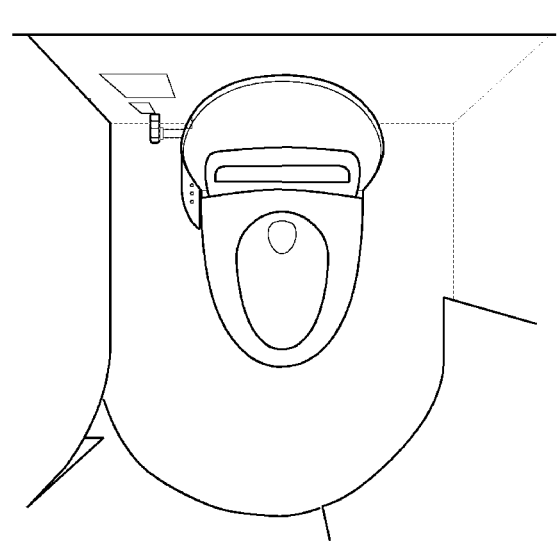
FIG. 20 illustrates an inside of a toilet booth.
Figure 21:
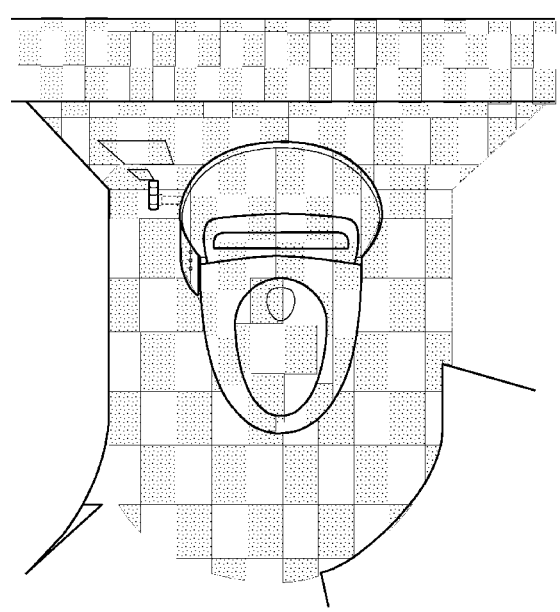
FIG. 21 illustrates a state of the toilet booth into which a projection pattern is projected.

FIG. 20 illustrates the inside of one of the toilet booths 14, and FIG. 21 illustrates a state of the toilet booth 14 into which the projection pattern is projected. As illustrated in FIG. 20, various toilet amenities (objects), such as the toilet bowl 41 and the shelf 145, are provided in the toilet booth 14. When the projection pattern is applied onto the toilet amenities, a projection pattern is formed that has deviations according to heights compared to the pattern on the floor plane, as illustrated in FIG. 21.

Figure 22:
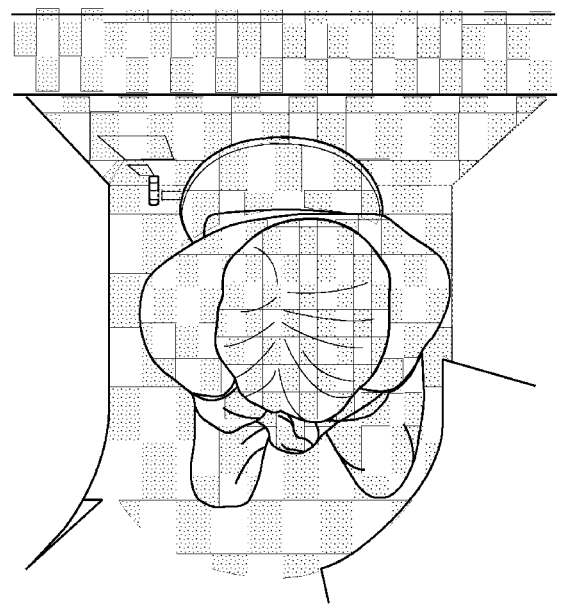
FIG. 22 illustrates a state in which a user is sitting on a toilet bowl.
Figure 23:
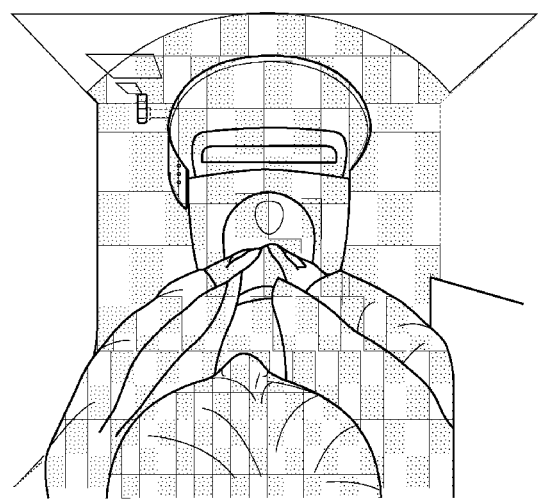
FIG. 23 illustrates a state in which the user is standing, facing the toilet bowl.
Figure 24:
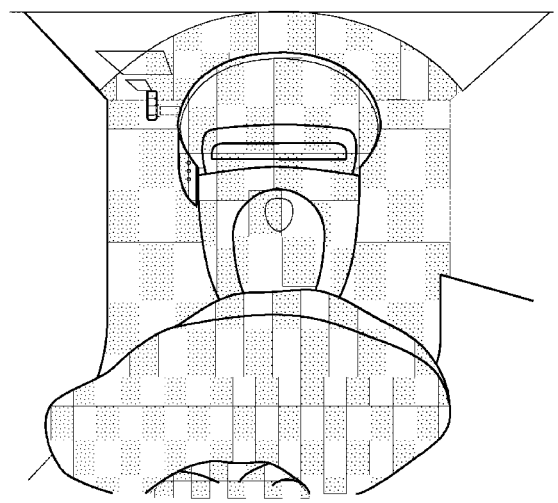
FIG. 24 illustrates a state in which the user is exiting, turning away from the toilet bowl.

FIG. 22 illustrates a state in which a user is sitting on the toilet bowl, FIG. 23 illustrates a state in which the user is standing, facing the toilet bowl, and FIG. 24 illustrates a state in which the user is exiting, turning away from the toilet bowl. Note that the projection patterns in FIGS. 21 to 24 are illustrated schematically, with part of the patterns being omitted or the like for convenience.

The location of the user illustrated in FIG. 22 in the horizontal plane coincides with the location of the toilet bowl 41, the locations of the head A1 and the shoulders A2 and A3 are lower than in FIGS. 23 and 24, and the thighs A13 and A17 and the knees A14 and A18 are detected at heights close to the height of the seat of the toilet bowl 41. Accordingly, it can be detected that the user is in a state sitting on the toilet bowl.

For the user illustrated in FIG. 23, it is determined that the user is located in front of the toilet bowl 41 and is in a normally standing state, based on the locations of the head A1, the shoulders A2 and A3, and the chest A4. However, if in a similar position, the location of the user in the horizontal plane coincides with the location of the toilet bowl 41 and the height of the head A1 is higher than in FIG. 23, the user may be getting on the toilet bowl, and therefore an abnormality is determined.

The locations and the heights of the user and the toilet amenities are detected in this manner, whereby it is possible to grasp a situation in a toilet and to determine an abnormality with high accuracy.

Effects of the Embodiment

As described above, according to the security management apparatus according to the present embodiment, a state of an object within a toilet booth is detected and compared with the states defined in the condition table of FIG. 10, an abnormality is determined if any one of the conditions in FIG. 10 is met, and a resolution of a video signal shot by the camera 11 is set. Thus, the video signal obtained by shooting the inside of the toilet booth is not outputted at an unnecessarily high resolution, so that it is possible to perform security management while ensuring user privacy.

In the security management apparatus according to the present embodiment, if an abnormality is determined by the abnormality determination unit 402 about a state of a user when the user exists in one of the toilet booths 14, the video control unit 403 sets a lower resolution of the video signal shot by the camera 11, than when no user exists in the toilet booth.

Thus, if a suspicious object is left behind within the toilet booth after exiting of the user, the video signal is transmitted at a high resolution to the manager terminal 3, so that the manager can detailedly check the suspicious object from the video signal. On the other hand, if an abnormality occurs in a state where the user exists in the toilet booth, since the resolution of the video signal transmitted to the manager terminal 3 is set lower, it is possible to ensure user privacy.

In the present embodiment, location information and movement information are obtained for each of the predetermined parts of the user, and abnormality determination is performed based on the location information and the movement information. Accordingly, a position and an action of the user made within the toilet booth can be grasped detailedly, and occurrence of an abnormality can be detected with high accuracy. For example, an abnormality is determined when the user falls on the floor or when the user makes no action.

An abnormality is determined when an action of touching the toilet bowl, the waste bin, or the like for a predetermined time period or longer is detected. Further, an abnormality is determined when an action of reaching a hand to the shelf 145 or the waste bin after an action of giving oneself an injection is detected. To find an injection needle or a microcamera itself through image processing, it is necessary to shoot the inside of the toilet booth in use by using a high-definition camera, and it is therefore difficult to ensure user privacy. Accordingly, in the present embodiment, not an injection needle or a microcamera itself but an action of the user is detected, and an abnormality is determined when the user makes an action appearing to set a spy camera or an action appearing to place a needle after injection on a shelf or in a waste bin. Thus, it is possible to detect an abnormality, such as setting of a spy camera or leaving of an injection needle, while ensuring user privacy.

In the present embodiment, the projection pattern is projected into the toilet booth, the projection pattern projected into the toilet booth is shot by using the camera 11 to obtain a shot pattern, height information on the object is obtained based on a deformation amount compared with the reference pattern, and the height information on the object is used, as a state of the object, for abnormality determination.

Thus, abnormality determination can be performed not by detailedly shooting the user, but based on the binary image (shot pattern) obtained by shooting the projection pattern projected onto the user. Accordingly, it is possible to detect an abnormality while ensuring user privacy.

Second Embodiment

In the first embodiment, if a user exists within a toilet booth, an alarm is outputted, and then if an abnormality is not resolved even after a wait for a predetermined time period, a video signal is transmitted at a lower resolution to the manager terminal 3. However, in a case where a user is unable to move due to a sudden illness, it is preferable to notify the manager so that the user can be rescued as soon as possible. In a case where a user is unable to move due to a sudden illness, it can be thought that it is less disadvantageous to the user if a video signal is transmitted to the manager terminal 3 without lowering resolution because the manager or the like opens the door to effect a rescue.

Accordingly, in a second embodiment, a configuration is made such that if it is determined that an urgent abnormality occurs, a video signal is immediately transmitted to the manager terminal 3 without lowering resolution. In the second embodiment, a configuration is made such that an external server checks occurrence of an urgent abnormality so as to prevent a video signal whose resolution is not lowered from being transmitted inappropriately. The other part of the configuration is similar to the configuration of the first embodiment, and therefore a repeated description will be omitted by giving the same reference numerals to the same elements, and the like.

Figure 25:
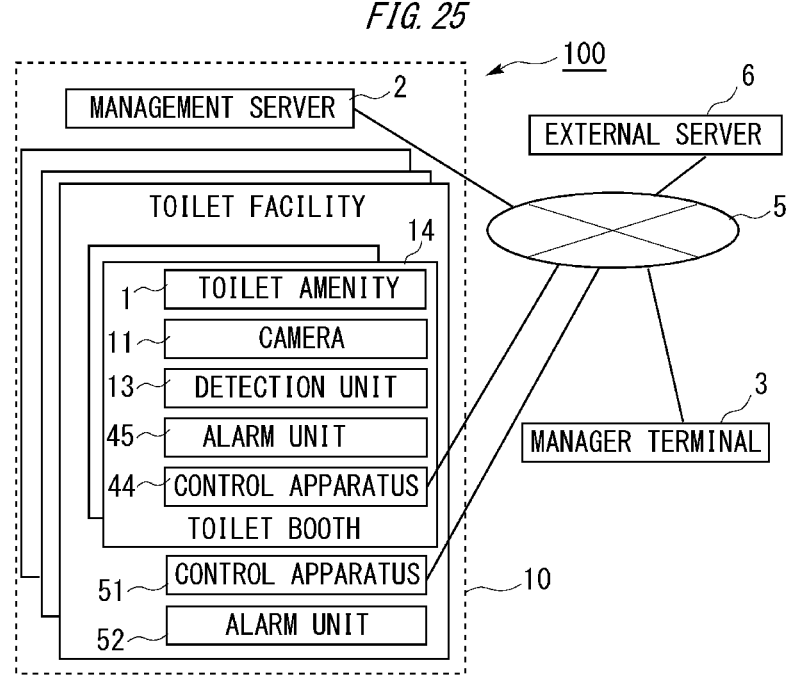
FIG. 25 illustrates a configuration of a security management system according to a second embodiment.

As illustrated in FIG. 25, a security management system according to the second embodiment is connected to an external server 6 via the network 5. Similarly to the management server 2 illustrated in FIG. 8, the external server 6 is an information processing apparatus (computer) including a processor unit (a CPU, a main memory, and the like), an auxiliary memory, a communication IF (Interface), and the like. The external server 6 is an apparatus out of management by the manager that uses the manager terminal 3 and is, for example, an apparatus operated by a reliable third-party organization or the like.

Figure 26:
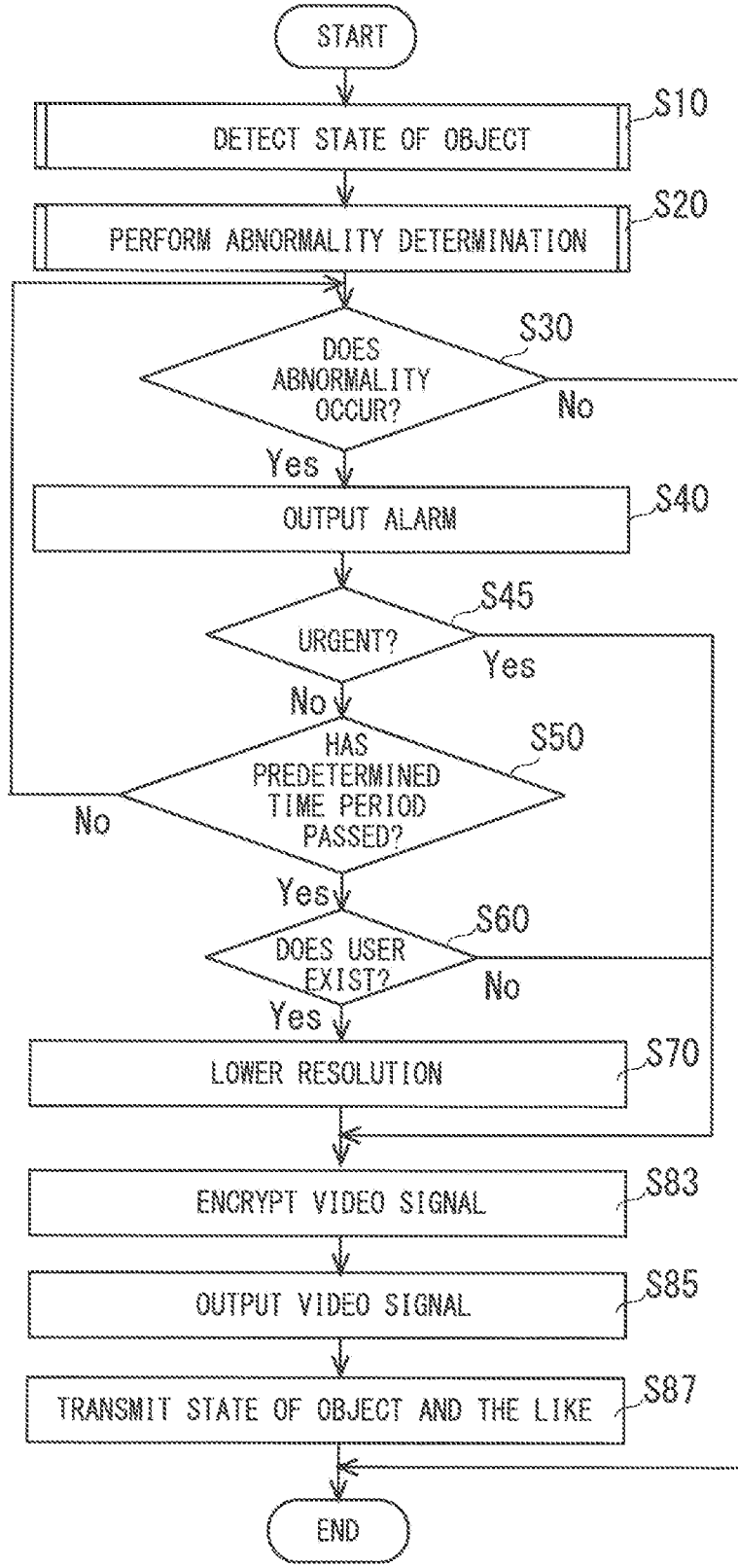
FIG. 26 illustrates processing of detecting an abnormality and issuing an alarm, by a control apparatus in the second embodiment.

FIG. 26 illustrates processing of detecting an abnormality and issuing an alarm, by the control apparatus 44 in the second embodiment. The control apparatus 44 repeatedly performs the processing in FIG. 26 cyclically or at a predetermined timing. Note that the processing at steps S10 to S40 from detecting a state of an object until issuing an alarm is similar to the processing in FIG. 11. After issuing an alarm in step S40, the control apparatus 44 determines whether or not the abnormality is urgent (step S45). For example, if the abnormality meets the condition 1 in FIG. 10, it is determined that the abnormality is urgent. In a case of any other abnormality, it is determined that the abnormality is not urgent. Note that the condition is not limited to this, and it can be arbitrarily set which condition is used to determine urgency. Then, if it is determined that the abnormality is urgent (step S45, Yes), the control apparatus 44 moves to step S83 and encrypts a video signal without lowering resolution.

Then, the control apparatus 44 transmits the encrypted video signal to the manager terminal 3 via the management server 2 (step S85). The control apparatus 44 transmits predetermined information other than the video signal, such as the state of the object detected in step S10 and identification information on the toilet booth within which occurrence of the abnormality is determined, and a decryption key (password) for decrypting the video signal to the external server (not illustrated) (step S87). Note that if it is determined that the abnormality is not urgent (step S45, No), the control apparatus 44 moves to step S50, and performs similar processing to the processing in FIG. 11.

Figure 27:
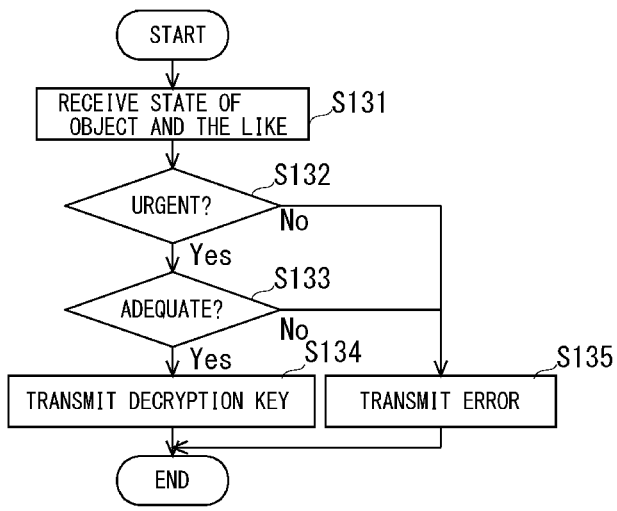
FIG. 27 illustrates operations of an external server.

On the other hand, as illustrated in FIG. 27, the external server 6 receives the information transmitted by the control apparatus 44 in step S87 via the management server 2 (step S131). Based on a condition table similar to the condition table in FIG. 10, the external server 6 determines whether or not the abnormality is urgent, with respect to the received state of the object (step S132). If it is determined that the abnormality is urgent (step S132, Yes), the external server 6 determines whether or not the received information is adequate, such as whether or not the identification information on the toilet booth with which the abnormality is determined matches with the identification information on the toilet booth in which the state of the object is detected, whether or not a time of day at which the state of the object was detected corresponds to a time of day at which the video signal was shot, and whether or not the address of the destination manager terminal has been registered. If it is determined that the received information is adequate (step S133, Yes), the external server 6 transmits the decryption key (password) for decrypting the video signal to the manager terminal 3 (step S134). Note that if it is determined in step S132 that the abnormality is not urgent (step S132, No), or if it is determined in step S133 that the received information is not adequate (step S133, No), the external server 6 notifies an error to the control apparatus 44 and the manager terminal 3 (step S135) and terminates the processing in FIG. 27.

Figure 28:
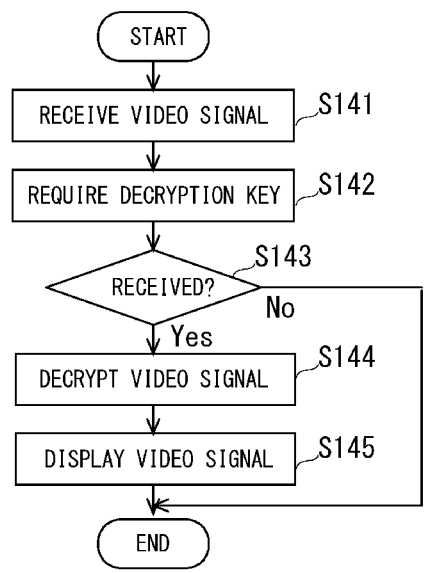
FIG. 28 illustrates operations of a manager terminal.

As illustrated in FIG. 28, the manager terminal 3 receives the video signal via the management server 2 (step S141).

Next, the manager terminal 3 connects to the external server 6 and requests the decryption key (step S142). Then, if the decryption key is received (step S143, Yes), the manager terminal 3 decrypts the video signal by using the received decryption key (step S144) and displays a video on a display apparatus (step S145). Note that if the decryption key cannot be received in step S143, that is, if an error is received (step S143, No), the processing in FIG. 28 is terminated.

As described above, according to the security management system in the second embodiment, if an urgent abnormality occurs, the abnormality is immediately notified to the manager terminal 3, and a video signal whose resolution is not lowered can be promptly checked by the manager. For example, it is possible to check a face color and consciousness of a user and the like and to call an ambulance or request a rescue without delay.

The external server 6 is used to check a situation of an object and other information and to transmit a decryption key to the manager terminal 3 to allow a video signal to be displayed only in an adequate case, whereby unauthorized operation of the condition table in the control apparatus 44 and inappropriate display of the video signal whose resolution is not lowered, which is caused by spoofing a signal of the detection unit 13, are prevented.

<Modification 1>

In the first and second embodiments, a configuration in step S110 in FIG. 15 is made such that the reference plane is a flat plane, and a differential image is obtained by comparing the reference pattern and the shot pattern. However, the projection pattern may be projected into a toilet booth before entering of a user as in FIG. 21 and shot to obtain a backdrop pattern, and a differential image in step S111 may be obtained by comparing the backdrop pattern and the shot pattern. An object thus obtained as the differential image is an object other than objects that stationarily exist in a toilet booth and is only any of a user, an object brought in by a user, and an object moved by a user. Accordingly, processing of detecting an object such as a toilet amenity is reduced, and the load of the processing is reduced.

<Modification 2>

In the first and second embodiments, a configuration is made such that the shot pattern, which is obtained by projecting the projection pattern onto an object in a toilet booth and shooting the projection pattern, is compared with the reference pattern, and heights of the object are obtained based on deviations between the shot pattern and the reference pattern. However, the configuration is not limited to this, and a ToF (Time Of Flight) range image sensor may be used.

Figure 29:
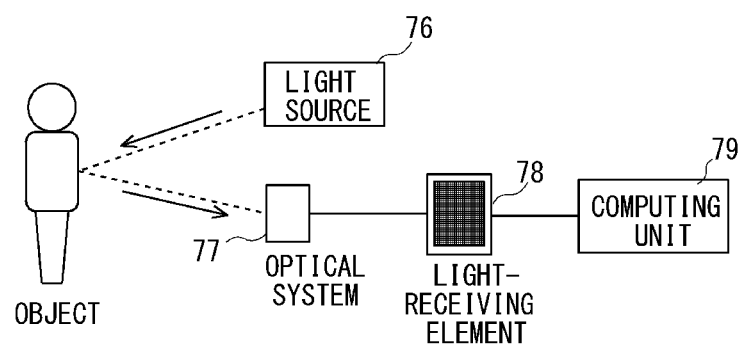
FIG. 29 illustrates a modification of a detection unit using a ToF range image sensor.

For example, as illustrated in FIG. 29, by using the ToF (Time Of Flight) range image sensor, measurement light is applied onto an object to be measured (a subject of a shot) from a light source 76, an image is formed by an optical system 77 from the measurement light reflected on the object, and the image of the object (the image of the subject of the shot) is formed on a light-receiving surface of a light-receiving element 78.

At this time, the measurement light applied from the light source 76 has a modulated intensity, and the phase of the modulated intensity shifts depending on a distance between the subject of the shot and the light-receiving element (optical path length), relative to the reflected light received by the light-receiving element 78. For example, as the distance between the object and the light-receiving element becomes longer, a phase delay (shift amount) becomes larger. Accordingly, based on the phase shift amount in the reflected light received by each pixel of the light-receiving element 78, a computing unit 79 obtains a distance from the object for each pixel.

The pixels of the light-receiving element 78 (FIG. 29) are arrayed on the light-receiving surface, and the location of each pixel on the light-receiving surface corresponds to a location in a space where the object exists. Accordingly, the control apparatus 44 can obtain the three-dimensional coordinates of each object within the three-dimensional space where the object exists, based on the location of each pixel in the light-receiving surface where each shot part in action appears and a distance of the pixel from the object. By using the ToF range image sensor, an image of the object can be obtained similarly to a camera. Accordingly, image processing such as pattern matching can be easily performed, and, for example, the predetermined parts of a user can be identified with high accuracy.

Such identification of an object and detection of a location are performed for each frame (one-frame image) that is shot at a predetermined cycle, for example, 1/30 fps, whereby changes in the location of each object in the temporally consecutive frames can be detected as movement information on the object.

Not limited to the ToF range image sensor, a configuration may be made such that a target object is scanned by using a three-dimensional laser scanner, or a target object is shot by using a stereo camera, and a distance from the object in an image is obtained based on parallax, or alternatively predetermined pattern light is projected onto a target object, and a distance from the target object is obtained based on a change in the pattern projected onto the target object, whereby a state of the target object is detected.

<Others>

The present invention is not limited to the examples illustrated in the figures, and various changes can of course be made without departing from the scope of the present invention. For example, the matters described above may be used in combination. In the embodiments, an example is illustrated in which the toilet booths 14 are target booths. However, a target booth is not limited to this, and a target booth only needs to be a place that cannot be shot when in use in order to ensure user privacy, such as a shower booth, a changeroom, a fitting room, and a capsule hotel room.

DESCRIPTION OF THE REFERENCE NUMERALS AND SYMBOLS

1 Toilet amenity
2 Management server
3 Manager terminal
5 Network
6 External server
8 Guide rail
9 Door
10 Toilet facility
11 Camera
13 Detection unit
14 Toilet booth
41 Toilet bowl
42 Toilet seat apparatus
43 Controller
44 Control apparatus
45 Alarm unit
46 Object detection unit
100 Security management system

The invention claimed is:

1. A security management system comprising:
an object detection unit that detects a state of an object within a target booth;
an abnormality determination unit that compares a result of the detection of the object with defined states and performs abnormality determination based on a result of the comparison;
a shooting unit that shoots an inside of the target booth; and
a video control unit that sets a resolution of a video signal to be outputted from the shooting unit based on a result of the abnormality determination wherein the object detection unit includes:
a projection unit that projects a predetermined projection pattern into the target booth;
a deformation amount calculation unit that acquires a shot pattern by shooting the projection pattern projected into the target booth by using the shooting unit, and, for each location in a horizontal plane in the target booth, obtains a deformation amount of the shot pattern compared with a reference pattern, which is the projection pattern when the projection pattern is projected onto a plane at a predetermined height; and
a state output unit that obtains height information on the object for each location in the horizontal plane based on the deformation amount of the shot pattern calculated by the deformation amount calculation unit, and outputs the height information on the object as the state of the object.

2. The security management system according to claim 1, wherein the object detection unit detects a user who uses the target booth, and if the abnormality determination unit determines that a state of the user is abnormal when the user exists within the target booth, the video control unit sets the resolution of the video signal shot by the shooting unit lower than when the user does not exist within the target booth.

3. The security management system according to claim 1, wherein the object detection unit detects a user who uses the target booth, and
if an action of the user detected by the object detection unit matches with a predetermined action among the defined states, the abnormality determination unit determines an abnormality.

4. The security management system according to claim 2, wherein the object detection unit obtains location information on each of predetermined parts of the user, and
the abnormality determination unit performs the abnormality determination based on the location information on each of the parts of the user.

5. The security management system according to claim 2, wherein the object detection unit obtains movement information on each of predetermined parts of the user, and
the abnormality determination unit performs the abnormality determination based on the movement information on each of the parts of the user.

6. The security management system according to claim 1, further comprising an entering and exiting detection unit that detects entering of a user into and exiting of the user from the target booth, wherein
the abnormality determination unit performs the abnormality determination by comparing a state detected by the object detection unit before entering of the user with a state detected by the object detection unit after exiting of the user.

7. A security management method performed by a computer, the computer performing:
projecting a predetermined projection pattern into a target booth;
shooting an inside of the target booth by using a shooting unit;
acquiring a shot pattern by shooting the projection pattern projected into the target booth by using a shooting unit, and, for each location in a horizontal plane in the target booth, obtaining a deformation amount of the shot pattern compared with a reference pattern, which is the projection pattern when the projection pattern is projected onto a plane at a predetermined height;

obtaining height information on the object for each location in the horizontal plane based on the deformation amount of the shot pattern;

detecting the height information on the object as a state of the object;

comparing a result of the detection of the object with defined states and performing abnormality determination based on a result of the comparison; and setting a resolution of a video signal to be outputted from the shooting unit based on a result of the abnormality determination.

8. A non-transitory computer-readable medium storing a security management program for causing a computer to execute:

projecting a predetermined projection pattern into a target booth;

shooting an inside of the target booth by using a shooting unit;

acquiring a shot pattern by shooting the projection pattern projected into the target booth by using a shooting unit, and, for each location in a horizontal plane in the target booth, obtaining a deformation amount of the shot pattern compared with a reference pattern, which is the projection pattern when the projection pattern is projected onto a plane at a predetermined height;

obtaining height information on the object for each location in the horizontal plane based on the deformation amount of the shot pattern;

detecting the height information on the object as a state of the object;

comparing a result of the detection of the object with defined states and performing abnormality determination based on a result of the comparison; and setting a resolution of a video signal to be outputted from the shooting unit based on a result of the abnormality determination.

* * * * *

UNITED STATES PATENT AND TRADEMARK OFFICE
CERTIFICATE OF CORRECTION

PATENT NO. : 10,706,707 B2
APPLICATION NO. : 16/325624
DATED : July 7, 2020
INVENTOR(S) : Kimura et al.

Page 1 of 1

It is certified that error appears in the above-identified patent and that said Letters Patent is hereby corrected as shown below:

In the Specification

In Column 10, Line 13, delete "14" and insert --T4--.

Signed and Sealed this
Fifth Day of January, 2021

Andrei Iancu
*Director of the United States Patent and Trademark Office*